United States Patent
Martin et al.

(10) Patent No.: US 12,481,160 B2
(45) Date of Patent: Nov. 25, 2025

(54) CONTENT INTERACTION DRIVEN BY EYE METRICS

(71) Applicant: Magic Leap, Inc., Plantation, FL (US)

(72) Inventors: Heather Michelle Martin, Wilton Manors, FL (US); Kevin John O'Brien, Plantation, FL (US); Pedro Luis Arroyo, Fort Lauderdale, FL (US); Flavio Deoliveira, Redding, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/627,219

(22) Filed: Apr. 4, 2024

(65) Prior Publication Data

US 2024/0248314 A1     Jul. 25, 2024

Related U.S. Application Data

(63) Continuation of application No. 17/256,974, filed as application No. PCT/US2019/042654 on Jul. 19, 2019, now Pat. No. 11,966,055.

(60) Provisional application No. 62/735,369, filed on Sep. 24, 2018, provisional application No. 62/700,775, filed on Jul. 19, 2018.

(51) Int. Cl.
    *G02B 27/01*     (2006.01)
    *G02B 27/00*     (2006.01)

(52) U.S. Cl.
    CPC ..... *G02B 27/0172* (2013.01); *G02B 27/0093* (2013.01); *G02B 2027/0127* (2013.01); *G02B 2027/0138* (2013.01); *G02B 2027/014* (2013.01); *G02B 2027/0178* (2013.01)

(58) Field of Classification Search
CPC .......... G06F 3/013; G06F 3/011; G06F 1/163; G02B 27/0093; G02B 27/0172; G02B 2027/0178; G02B 2027/0138; G02B 27/017; G02B 2027/014; G02B 2027/0187
See application file for complete search history.

(56) References Cited

U.S. PATENT DOCUMENTS

| | | | |
|---|---|---|---|
| 6,388,639 B1 | 5/2002 | Hoshino et al. | |
| 6,850,221 B1 | 2/2005 | Tickle | |
| | | (Continued) | |

FOREIGN PATENT DOCUMENTS

| | | |
|---|---|---|
| CN | 105828702 A | 8/2016 |
| DE | 69935883 T2 | 12/2007 |
| | (Continued) | |

OTHER PUBLICATIONS

US 10,481,681 B2, 11/2019, Mor (withdrawn)
(Continued)

*Primary Examiner* — Xuemei Zheng
(74) *Attorney, Agent, or Firm* — Fish & Richardson P.C.

(57) ABSTRACT

A head mounted display system for displaying image content to a user comprises at least one display configured to be worn by a user to present virtual content to first and second eyes of a user, one or more inwardly facing sensors or camera configured to monitor one or both of the users eye and processing electronics. This head mounted display system is configured such that virtual content activity can be initiated and/or driven from eye inputs such as gaze direction, eyelid motions (e.g., blinking), and/or other eye gestures.

17 Claims, 13 Drawing Sheets

(56) References Cited

U.S. PATENT DOCUMENTS

| | | |
|---|---|---|
| D514,570 S | 2/2006 | Ohta |
| 8,437,513 B1 | 5/2013 | Derakhshani et al. |
| 8,950,867 B2 | 2/2015 | Macnamara |
| 8,976,110 B2 | 3/2015 | Eskilsson et al. |
| 9,081,426 B2 | 7/2015 | Armstrong |
| 9,207,760 B1 | 12/2015 | Wu et al. |
| 9,215,293 B2 | 12/2015 | Miller |
| D752,529 S | 3/2016 | Loretan et al. |
| 9,310,559 B2 | 4/2016 | Macnamara |
| 9,348,143 B2 | 5/2016 | Gao et al. |
| D758,367 S | 6/2016 | Natsume |
| D759,657 S | 6/2016 | Kujawski et al. |
| 9,417,452 B2 | 8/2016 | Schowengerdt et al. |
| 9,470,906 B2 | 10/2016 | Kaji et al. |
| 9,489,044 B2 | 11/2016 | Fateh |
| 9,547,174 B2 | 1/2017 | Gao et al. |
| 9,606,622 B1 | 3/2017 | Brothers et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,851,563 B2 | 12/2017 | Gao et al. |
| 9,857,591 B2 | 1/2018 | Welch et al. |
| 9,864,429 B2 * | 1/2018 | Lee .................. G06F 3/0484 |
| 9,874,749 B2 | 1/2018 | Bradski |
| 10,039,445 B1 * | 8/2018 | Torch .................. A61B 5/18 |
| 10,649,527 B2 | 5/2020 | Mor |
| 10,698,215 B2 | 6/2020 | Welch et al. |
| 10,901,205 B1 * | 1/2021 | Lu .................. G02B 27/017 |
| 11,112,863 B2 | 9/2021 | Miller et al. |
| 2004/0130680 A1 | 7/2004 | Zhou et al. |
| 2005/0280603 A1 | 12/2005 | Aughey et al. |
| 2006/0028436 A1 | 2/2006 | Armstrong |
| 2006/0140166 A1 | 6/2006 | Albulet |
| 2007/0081123 A1 | 4/2007 | Lewis |
| 2010/0118019 A1 | 5/2010 | Cases et al. |
| 2011/0075257 A1 | 3/2011 | Hua et al. |
| 2011/0085700 A1 | 4/2011 | Lee |
| 2011/0106025 A1 | 5/2011 | Hall et al. |
| 2011/0182469 A1 | 7/2011 | Ji et al. |
| 2011/0242661 A1 | 10/2011 | Simmonds |
| 2012/0075168 A1 | 3/2012 | Osterhout et al. |
| 2012/0127062 A1 | 5/2012 | Bar-Zeev et al. |
| 2012/0162549 A1 | 6/2012 | Gao et al. |
| 2012/0242570 A1 | 9/2012 | Kobayashi |
| 2013/0082922 A1 | 4/2013 | Miller |
| 2013/0088780 A1 | 4/2013 | Jarvenpaa et al. |
| 2013/0117377 A1 | 5/2013 | Miller |
| 2013/0125027 A1 | 5/2013 | Abovitz |
| 2013/0135196 A1 | 5/2013 | Park et al. |
| 2013/0208234 A1 | 8/2013 | Lewis |
| 2013/0242187 A1 | 9/2013 | Noda et al. |
| 2013/0242262 A1 | 9/2013 | Lewis |
| 2013/0257709 A1 | 10/2013 | Raffle et al. |
| 2013/0300634 A1 | 11/2013 | White et al. |
| 2013/0300652 A1 | 11/2013 | Raffle et al. |
| 2013/0314793 A1 | 11/2013 | Robbins et al. |
| 2014/0071539 A1 | 3/2014 | Gao |
| 2014/0145914 A1 | 5/2014 | Latta et al. |
| 2014/0177023 A1 | 6/2014 | Gao et al. |
| 2014/0218281 A1 | 8/2014 | Amayeh et al. |
| 2014/0218468 A1 | 8/2014 | Gao et al. |
| 2014/0247210 A1 | 9/2014 | Henderek et al. |
| 2014/0267420 A1 | 9/2014 | Schowengerdt |
| 2014/0306866 A1 | 10/2014 | Miller et al. |
| 2014/0361976 A1 * | 12/2014 | Osman .............. G02B 27/017 345/156 |
| 2014/0380249 A1 | 12/2014 | Fleizach |
| 2015/0016777 A1 | 1/2015 | Abovitz et al. |
| 2015/0029096 A1 | 1/2015 | Ishihara |
| 2015/0061999 A1 | 3/2015 | Kim et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0220157 A1 * | 8/2015 | Marggraff .............. G06F 3/0485 345/156 |
| 2015/0222883 A1 | 8/2015 | Welch |
| 2015/0222884 A1 | 8/2015 | Cheng |
| 2015/0235435 A1 | 8/2015 | Miller et al. |
| 2015/0235456 A1 | 8/2015 | Schwongerdt |
| 2015/0241967 A1 | 8/2015 | Saripalle et al. |
| 2015/0248169 A1 | 9/2015 | Abovitz et al. |
| 2015/0248170 A1 | 9/2015 | Abovitz et al. |
| 2015/0248788 A1 | 9/2015 | Abovitz et al. |
| 2015/0248793 A1 | 9/2015 | Abovitz et al. |
| 2015/0268415 A1 | 9/2015 | Schowengerdt et al. |
| 2015/0268720 A1 | 9/2015 | Kobayashi |
| 2015/0277129 A1 | 10/2015 | Hua et al. |
| 2015/0301599 A1 | 10/2015 | Miller |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0338915 A1 | 11/2015 | Publicover et al. |
| 2015/0346490 A1 | 12/2015 | TeKolste et al. |
| 2015/0346495 A1 | 12/2015 | Welch et al. |
| 2015/0356781 A1 | 12/2015 | Miller |
| 2015/0381885 A1 | 12/2015 | Kim et al. |
| 2016/0011419 A1 | 1/2016 | Gao |
| 2016/0012612 A1 | 1/2016 | Koga |
| 2016/0025971 A1 * | 1/2016 | Crow .................. A61B 3/113 345/156 |
| 2016/0026253 A1 | 1/2016 | Bradski et al. |
| 2016/0026971 A1 | 1/2016 | Klein et al. |
| 2016/0031619 A1 | 2/2016 | Coker et al. |
| 2016/0043289 A1 | 2/2016 | Inomata et al. |
| 2016/0048220 A1 | 2/2016 | Shen |
| 2016/0062459 A1 | 3/2016 | Publicover et al. |
| 2016/0085300 A1 | 3/2016 | Robbins et al. |
| 2016/0109709 A1 | 4/2016 | Osterhout |
| 2016/0131905 A1 * | 5/2016 | Takahashi .............. G06F 3/0485 345/8 |
| 2016/0133201 A1 | 5/2016 | Border et al. |
| 2016/0233268 A1 | 8/2016 | Jiroku |
| 2016/0270656 A1 | 9/2016 | Samec et al. |
| 2016/0353988 A1 | 12/2016 | Moller et al. |
| 2017/0011210 A1 | 1/2017 | Cheong et al. |
| 2017/0017631 A1 | 1/2017 | Tang et al. |
| 2017/0123492 A1 | 5/2017 | Marggraff et al. |
| 2017/0237974 A1 | 8/2017 | Samec et al. |
| 2017/0255259 A1 | 9/2017 | Mor |
| 2017/0276948 A1 | 9/2017 | Welch et al. |
| 2017/0293356 A1 | 10/2017 | Khaderi et al. |
| 2018/0039083 A1 | 2/2018 | Miller et al. |
| 2018/0247119 A1 * | 8/2018 | Ryan .................. A61B 3/113 |
| 2019/0129179 A1 * | 5/2019 | Inoue .................. G06T 19/006 |
| 2019/0369724 A1 | 12/2019 | Mor |
| 2020/0319466 A1 | 10/2020 | Welch |
| 2020/0379553 A1 | 12/2020 | Mor |
| 2021/0169578 A1 * | 6/2021 | Calloway .............. A61B 34/20 |
| 2021/0259601 A1 | 8/2021 | Kornberg et al. |

FOREIGN PATENT DOCUMENTS

| | | |
|---|---|---|
| EP | 0 849 959 | 6/1998 |
| EP | 2 314 201 | 4/2011 |
| EP | 2315439 A1 | 4/2011 |
| EP | 3 109 689 | 12/2016 |
| JP | H08-266468 | 10/1996 |
| JP | H08-271953 | 10/1996 |
| JP | H08322004 A | 12/1996 |
| JP | H09105853 A | 4/1997 |
| JP | H11-249064 | 9/1999 |
| JP | H11249064 A | 9/1999 |
| JP | 2003-241100 | 8/2003 |
| JP | 2006-059147 | 3/2006 |
| JP | 2008523434 A | 7/2008 |
| JP | 2009-105853 | 5/2009 |
| JP | 2009-267733 | 11/2009 |
| JP | 2010139589 A | 6/2010 |
| JP | 2010-187132 | 8/2010 |
| JP | 2010212899 A | 9/2010 |
| JP | 2012-022150 | 2/2012 |
| JP | 2012-203127 | 10/2012 |

(56) References Cited

FOREIGN PATENT DOCUMENTS

| | | |
|---|---|---|
| JP | 2013-162407 | 8/2013 |
| JP | 2015-081313 | 4/2015 |
| JP | 2015099238 A | 5/2015 |
| JP | 2015141686 A | 8/2015 |
| JP | 2015-205114 | 11/2015 |
| JP | 2016-018487 | 2/2016 |
| JP | 2017-058853 | 3/2017 |
| JP | 2017058853 A * | 3/2017 |
| KR | 10-2012-0107949 | 10/2012 |
| KR | 2013-0139280 | 12/2013 |
| KR | 2015-0098162 | 8/2015 |
| KR | 2015-0099430 | 8/2015 |
| WO | WO 2003/079272 | 9/2003 |
| WO | WO 2013/170073 | 11/2013 |
| WO | WO 2014/057618 | 4/2014 |
| WO | 2015072202 A1 | 5/2015 |
| WO | WO 2015/081313 | 6/2015 |
| WO | WO 2015/134740 | 9/2015 |
| WO | WO 2015/184412 | 12/2015 |
| WO | WO 2016/018487 | 2/2016 |
| WO | WO 2017/139667 | 8/2017 |
| WO | WO 2017/151974 | 9/2017 |
| WO | WO 2017/165848 | 9/2017 |
| WO | WO 2019/143844 | 7/2019 |
| WO | WO 2020/042654 | 1/2020 |

OTHER PUBLICATIONS

"Basic Psychological Process—B.Sc. in Counseling Psychology Core Course", University of Calicut, School of Distance Education, (2011 Admission onwards) in 189 pages. URL: http://www.universityofcalicut.info/syl/CP1B01BasicPsychologicalProcesses.pdf.
"Big Tree Measuring Methods", Nature Nova Scotia, accessed Jul. 11, 2017, in 5 pages. URL: http://www.naturelst.net/naturens/files/tree_measure.html.
"Digital Mirror Fashion", GibamVision, retrieved Sep. 22, 2016, in 2 pages. URL: http://www.gibamvision.com/en/digital-mirror-fashion.
"Eye Intensity Response, Contrast Sensitivity", Telescope-Optics.net, retrieved Jul. 11, 2017, in 14 pages. URL: http://www.telescope-optics.net/eye_intensity_response.htm.
"Eye Spectral Response", Telescope-Optics.net, retrieved Jul. 11, 2017, in 9 pages. URL: http://www.telescope-optics.net/eye_spectral_response.htm.
"How do I calculate total acceleration from the x, y, and z g-force values given by an accelerometer?", Quora, answered Dec. 28, 2015, accessed Jul. 11, 2017, in 4 pages. URL: https://www.quora.com/How-do-I-calculate-total-acceleration-from-the-x-y-and-z-g-force-values-given-by-an-accelerometer.
"Positron emission tomography", Wikipedia, as archived Aug. 3, 2017, in 14 pages. URL: https://web.archive.org/web/20170803232043/https://en.wikipedia.org/wiki/Positron_emission_tomography.
"Research helps stroke victims retrain brain", Victoria University, Dec. 10, 2015, as archived Aug. 10, 2017, in 3 pages. URL: https://web.archive.org/web/20170810220140/https://www.vu.edu.au/news-events/mediareleases/research-helps-stroke-victims-retrain-brain.
"Scientists literally Stretch Brain to Map Details", Medgadget, Aug. 1, 2016, as archived Aug. 4, 2017, in 5 pages. URL: https://web.archive.org/web/20170804161858/https://www.medgadget.com/2016/08/scientists-stretchbrain.html.
"The Telescopic Eye", Telescope-Optics.net, archived Jul. 21, 2016, in 5 pages. URL: https://web.archive.org/web/20160721003510/https://www.telescope-optics.net/eye.htm.
"Transcranial Direct Current Stimulation Shown to Improve Learning Skills", Medgadget, Mar. 1, 2016, as archived Aug. 10, 2017, in 6 pages. URL: https://web.archive.org/save/_embed/https://www.medgadget.com/2016/03/transcranial-direct-currentstimulation-shown-improve-learning-skills.html.

"True Mirror®: See Yourself™", True Mirror, The True Mirror Company, Inc., 2015, accessed Jun. 30, 2016, in 3 pages. URL: http://www.truemirror.com/.
"True Mirrors" (homepage), True Mirror Company, as archived Aug. 17, 2017, in 2 pages. URL: https://web.archive.org/web/20170817144914/http://www.truemirror.com/.
American Academy of Neurology (MN), "Ultrasound headset may be new way to recognize concussion on the sidelines." ScienceDaily, Apr. 13, 2016, as archived Aug. 10, 2017, in 3 pages. URL: https://web.archive.org/web/20170810201930/https://www.sciencedaily.com/releases/2016/041160413183041.htm.
Anthony, S., "MIT releases open-source software that reveals invisible motion and detail in video", Extreme Tech, Feb. 28, 2013, as accessed Aug. 4, 2017, in 5 pages.
ARToolKit: https://web.archive.org/web/20051013062315/http://www.hitl.washington.edu:80/artoolkit/documentation/hardware.htm, archived Oct. 13, 2005, 3 pages.
Azuma, "A Survey of Augmented Reality," Teleoperators and Virtual Environments 6, 4 (Aug. 1997), 135 pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNG-Chapel Hill, NC, Feb. 1995, 262 pages.
Bimber, et al., "Spatial Augmented Reality—Merging Real and Virtual Worlds," 2005 https://web.media.mit.edu/~raskar/book/BimberRaskarAugmentedRealityBook.pdf, 393 pages.
Butler, D. et al., "Mirror, Mirror, on the Wall, How Does My Brain Recognize My Image at All?" PLoS One, vol. 7, Issue 2, 2012, published online Feb. 16, 2012, in 11 pages. URL: http://www.ncbi.nlm.nih.gov/pmc/articles/PMC3281068.
Carter, T. et al., "UltraHaptics: Multi-Point Mid-Air Haptic Feedback for Touch Surfaces", UIST '13 Proceedings of the 26th Annual ACM Symposium on User Interface Software and Technology, Oct. 2013, in 10 pages. URL: http://big.cs.bris.ac.uk/wp-content/uploads/2013/10/Ultrahaptics.Carter.2013.pdf.
CNRS, "Learning to read: Tricking the brain," ScienceDaily, Aug. 28, 2014, in 3 pages. URL: http://www.sciencedaily.com/releases/2014/08/ 140828115248.htm.
Curawave: "About The Curawave (MRgFUS) Treatment", Curawave, as archived Aug. 16, 2017, in 4 pages. URL: https://web.archive.org/web/20170816232429/http://usa.uterine-fibroids.org/about-mrgfus/.
Economic and Social Research Council, "How can we still read words when the letters are jumbled up?" ScienceDaily, Mar. 15, 2013, in 2 pages. URL: https://www.sciencedaily.com/releases/2013/03/130315074613.htm.
European Extended Search Report, re EP Application No. 17760851.0, dated Sep. 19, 2019. 8 pages.
European Extended Search Report, re EP Application No. 17771290, dated Oct. 17, 2019. 10 pages.
Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.
Fotopoulou, A. et al., "Mirror-view reverses somatoparaphrenia: dissociation between first- and third-person perspectives on body ownership", Neuropsychologia, vol. 49, Dec. 2011, in 10 pages. URL: http://www.ncbi.nlm.nih.gov/pubmed/22023911.
Gilliam, C., "Can VR Justify QHD and 4K Displays?", DA Developers, Feb. 11, 2015, as archived Aug. 4, 2017, in 7 pages. URL: https://web.archive.org/web/20170804164547/https://www.da-developers.com/can-vr-justify-qhd-and-4k-displays/.
Green, M., "Night Vision", Visual expert, as archived Aug. 4, 2017, in 9 pages. URL: https://web.archive.org/web/20170804160954/http://www.visualexpert.com/Resources/nightvision.html.
Griffith, D., "'Digital neurotherapeutic' developed at UC Davis Mind Institute", Daily Democrat, Jun. 24, 2016, as archived Aug. 3, 2017, in 3 pages. URL: https://web.archive.org/web/20170803232850/http://www.dailydemocrat.com/generalnews/20160624/digital-neurotherapeutic-developed-at-uc-davis-mind-institute.
Harrison, W., "Eye movement targets are released from visual crowding", Will J Harrison, Mar. 13, 2013, as archived Aug. 4,

(56) References Cited

OTHER PUBLICATIONS 2017, in 3 pages. URL: https://web.archive.org/web/20170804165524/http://wil ljharrison.com/2013/03/eye-movement-targets-are-released-from-visual-crowding/.

Ibsen, S. et al., "Sonogenetics is a non-invasive approach to activating neurons in Caenorhabditis elegans", Nature Communications, Sep. 15, 2015, in 12 pages. URL: http://www.nature.com/ncomms/2015/150915/ncomms9264/full/ncomms9264.html.

Intel: "Retail Solution Configuration: Memory Mirror Solution", Intel, printed Sep. 25, 2015, in 3 pages. URL: http://www.intel.com/content/www/us/en/retail/nrf-2014/memory.html?wapkw=mi.

International Preliminary Report on Patentability for PCT Application No. PCT/US17/20522, issued Sep. 4, 2018, 6 pages.

International Preliminary Report on Patentability for PCT Application No. PCT/US17/24145, issued Sep. 25, 2018, 9 pages.

International Preliminary Report on Patentability for PCT Application No. PCT/US19/42654, issued Jan. 19, 2021, 11 pages.

International Search Report and Written Opinion for PCT Application No. PCT/US17/20522, mailed May 19, 2017, 18 pages.

International Search Report and Written Opinion for PCT Application No. PCT/US17/24145, mailed Jul. 26, 2017, 20 pages.

International Search Report and Written Opinion for PCT Application No. PCT/US19/42654, mailed Oct. 11, 2019, 19 pages.

Invitation to Pay Additional Fees And, Where Applicable, Protest Fee for PCT Application No. PCT/US17/24145, mailed Jun. 2, 2017, 4 pages.

Iosa, M. et al., "Seven Capital Devices for the Future of Stroke Rehabilitation", Stroke Research and Treatment, vol. 2012, Nov. 2012, in 9 pages. URL: http://www.ncbi.nlm.nih.gov/pmc/articles/PMC3530851/.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and TA Furness, pp. 258-288, Oxford University Press, New York (1995), 50 pages.

Jarrett, "Read This Before Zapping Your Brain," Wired Magazine, Jan. 20, 2014, retrieved on Apr. 14, 2022, retrieved from URL: <http://www.wired.com/2014/01/read-zapping-brain/>, 4 pages.

Jurcina, K., "clinApp-Prism Adaptation", YouTube, published Dec. 7, 2015, as archived Sep. 8, 2017, in 10 pages (with video transcription). URL: https://web.archive.org/web/20170908195617 /https://www.youtube.com/watch?v=k1K5aV678wQ.

Khan Academy: "The effects of ultrasound on different tissue types", Khan Academy, as archived Aug. 11, 2017, in 9 pages. URL: https://web.archive.org/web/20170811162328/https://www.khanacademy.org/test-prep/mcat/physicalsciences-practice/physical-sciences-practice-tut/e/the-effects-of-ultrasound-on-different-tissue-types.

Kolb, H., "Part XIII: Facts and Figures concerning the human retina by Helga Kolb", Webvision, archived Jul. 2, 2016, in 5 pages. URL: https://web.archive.org/web/20160702134518/http://webvision.med.utah.edu/book/part-xiii-facts-and-figures-concerning-the-human-retina/.

Le, et al., "Robust and Accurate Skeletal Rigging from Mesh Sequences," ACM Transactions on Graphics (TOG), vol. 33(4), pp. 84-93, Jul. 2014.

Matsumoto, J., "I was recently diagnosed with parkinsonism. What causes it, and how can I cope as it progresses?", Mayo Clinic, as archived Aug. 11, 2017, in 3 pages. URL: https://web.archive.org/web/20170811161634/http://www.mayoclinic.org/diseasesconditions/parkinsons-disease/expert-answers/parkinsonism/faq-20058490.

Milde, C. et al., "Do Mirror Glasses Have the Same Effect on Brain Activity as a Mirror Bo? Evidence from a Functional Magnetic Resonance Imaging Study with Healthy Subjects", PLoS One, vol. 10, Issue. 5, published online May 27, 2015, in 13 pages. URL: http://www.ncbi.nlm.nih.gov/pmc/articles/PMC4446290/.

MillenniumDroid, "True Mirror—Android Apps on Google Play", Google Play Store, retrieved Jun. 30, 2016, in 2 pages. URL: https://play.google.com/store/apps/details?id=com.blogspot.mdroid.mymirror&hl=en.

ModernNeurology, "Binocular Stereoscopic Depth Perception", YouTube, published Mar. 15, 2016, as archived Sep. 8, 2017, in 11 pages (with video transcription). URL: https://web.archive.org/web/20170906181457/https://www.youtube.com/watch?v=NarhP8PAdyc&feature=youtube&app=desktop.

Morries, L. et al., "Treatments for traumatic brain injury with emphasis on transcranial near-infrared laser phototherapy", Neuropsychiatric Disease and Treatment, vol. 11, Aug. 2015, in 17 pages. URL: http://www.ncbi.nlm.nih.gov/pubmed/26347062.

Mrovlje, J. et al., "Distance measuring based on stereoscopic pictures", 9th International PhD Workshop on Systems and Control: Young Generation Viewpoint, Oct. 2008, in 6 pages. URL: http://dsc.ijs.si/files/papers/S101 %20Mrovlje.pdf.

Ogle et al., "Depth of Focus of the Human Eye," Journal of the Optical Society of America, Mar. 1959, 49(3):273-80, 3 pages (Abstract only).

Plataforma SING, "Through the looking glass: Research into brain's ability to understand mirror-image words sheds light on dyslexia," ScienceDaily, Mar. 31, 2011, in 3 pages. URL: https://www.sciencedaily.com/releases/2011/03/110331080037.htm.

Podda, M. et al., "Anodal transcranial direct current stimulation boosts synaptic plasticity and memory in mice via epigenetic regulation of Bdnf expression", Scientific Reports, Feb. 24, 2016, in 19 pages. URL: http://www.nature.com/articles/srep22180.

Preston, C. et al., "Owning the body in the mirror: The effect of visual perspective and mirror view on the full-body illusion", Scientific Reports, vol. 5, published online Dec. 17, 2015, in 13 pages. URL: http://www.ncbi.nlm.nih.gov/pmc/articles/PMC4683587/.

Pullen, L., "Brain Therapy Helps Rehabilitate Stroke Patients", Medscape, Dec. 5, 2013, in 10 pages. URL: http://www.medscape.com/viewarticle/815458.

Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjrnk&feature=youtube.

Rutkin, A., "Digital mirror reveals what lies under your skin", New Scientist, Apr. 15, 2014, in 3 pages. URL: https://www.newscientist.com/article/mg22229653-800-digital-mirror-reveals-what-lies-under-your-skin/.

Searle, R., "10 Crazy Facts About Mirrors," ListVerse, Dec. 30, 2013, in 11 pages. URL: http://listverse.com/2013/12/30/10-crazy-facts-about-mirrors/.

Szegedy et al., "Going deeper with convolutions", arXiv:1409.4842v1, Sep. 17, 2014 in 12 pages.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

The New York Times, "MIT Computer Program Reveals Invisible Motion in Video | The New York Times", YouTube, published Feb. 27, 2013, as archived Sep. 8, 2017, in 10 pages (with video transcription). URL: https://web.archive.org/web/20170906180629/https://www.youtube.com/watch?feature=youtu.be&t=1m5s&v=3rWycBEHn3s&app=desktop.

Wang, W. et al., "Neural Interface Technology for Rehabilitation: Exploiting and Promoting Neuroplasticity", Physical Medicine Rehabilitation Clinics of North America, vol. 21, Feb. 2010, in 22 pages. URL: http://www.ncbl.nlm.nih.gov/pmc/articles/PMC2788507/.

Wikipedia: "Adaptation", Wikipedia, printed Jul. 11, 2017, in 9 pages. URL: https://en.wikipedia.org/wiki/Adaptation_(eye).

Wikipedia: "Atomic Mirror", Wikipedia, printed Dec. 13, 2016, in 2 pages. URL: http/en.wikipedia.org/wiki/Atomic_mirror.

Wikipedia: "Body transfer illusion", Wikipedia, as archived Aug. 10, 2017, in 4 pages. URL: https://web.archive.org/web/20170810213201 /https://en.wikipedia.org/wiki/Body_transfer_illusion.

Wikipedia: "Mirror Neuron", Wikipedia, printed Jun. 30, 2016, in 17 pages. URL: https://en.wikipedia.org/wiki/Mirror_neuron.

(56) References Cited

OTHER PUBLICATIONS

Wikipedia: "Non-reversing mirror," Wikipedia, printed Jun. 30, 2016, in 2 pages. URL: https://en.wikipedia.org/wiki/Non-reversing_mirror.
Wikipedia: "Parkinsonism", Wikipedia, as archived Aug. 10, 2017, in 4 pages. URL: https://web.archive.org/web/20170810214355/https://en. wikipedia.org/wiki/Parkinsonism.
Wikipedia: "Peripheral vision", Wikipedia, as archived Aug. 3, 2017, in 6 pages. URL: https://web.archive.org/web/20170803223449/https://en.wikipedia. org/wiki/Peripheral_vision.
Wikipedia: "Prism adaptation", Wikipedia, as archived Aug. 10, 2017, in 5 pages. URL: https://web.archive.org/web/20170810213634/https://en.wikipedia.org/wiki/Prism_adaptation.
Zult, T. et al., "Mirror illusion reduces motor cortical inhibition in the ipsilateral primary motor cortex during forceful unilateral muscle contractions", Journal of Neurophysiology, vol. 113, Issue 7, Apr. 2015, published online Jan. 28, 2015, in 14 pages. URL: http://www.ncbi.nlm.nih.gov/pmc/articles/PMC4416555/.
Liu et al., "An optical see-through head mounted display with addressable focal planes," Paper, Presented at Proceedings of the IEEE International Symposium on Mixed and Augmented Reality, Cambridge, UK, Sep. 15-18, 2008, pp. 33-42; IEEE Transactions on Visualization and Computer Graphics, May 2010, 16(3):381-393, 10 pages.

\* cited by examiner

CONTENT INTERACTION DRIVEN BY EYE METRICS

CROSS-REFERENCE TO RELATED APPLICATIONS

This application is a continuation of U.S. application Ser. No. 17/256,974, filed on Dec. 29, 2020, entitled "CONTENT INTERACTION DRIVEN BY EYE METRICS," which is a National Stage Application under 35 USC § 371 and claims the benefit of International Patent Application No. PCT/US2019/042654, filed on Jul. 19, 2019, which claims the benefit of priority under 35 U.S.C. § 119(e) to U.S. Provisional Application No. 62/700,775, filed on Jul. 19, 2018, entitled "CONTENT INTERACTION DRIVEN BY EYE METRICS," and 62/735,369, filed on Sep. 24, 2018, entitled "CONTENT INTERACTION DRIVEN BY EYE METRICS," each of which is hereby incorporated by reference herein in its entirety.

BACKGROUND

Field

The present disclosure relates to virtual reality and augmented reality imaging and visualization systems and more particularly to content interaction means in virtual reality and augmented reality systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

SUMMARY

Information input tools, ranging from the computer mouse to the keyboard to handheld controllers, are all adapted to translate a human physical act into an information signal. As sensor technology improves, the former need for discrete and dedicated input tools to receive a designated user act can transition to accurate passive detection of more subtle inputs.

Described herein are means of initiating and/or driving virtual content activity from eye inputs such as gaze direction, eyelid motions (e.g., blinking), and/or other eye gestures.

The systems, methods and devices of this disclosure each have several innovative aspects, no single one of which is solely responsible for the desirable attributes disclosed herein. A variety of example systems and methods are provided below.

Part I

Example 1: A head mounted display system for displaying image content to a user, the display system comprising:
  at least one display configured to be worn by a user to present virtual content to first and second eyes of a user;
  a first inward facing camera configured to image the first eye of the user;
  a second inward facing camera configured to image the second eye of the user; and
  processing electronics in communication with the first and second inward-facing cameras and said at least one display, the processing electronics configured to:
    present virtual content to the user on said at least one display;
    using the first inward-facing camera, determine that the first eye is at least partially closed;
    using the second inward-facing camera, determine that the second eye is at least partially closed; and
    based on the determination that the first and second eyes of the user are at least partially closed, alter a state of the head mounted display system so as to modify the virtual content presented to the user, the manner in which virtual content is presented to the user, a performance feature of the head mounted display system apparent to the user, or any combination thereof.

Example 2: The display system of Example 1, wherein the processing electronics are configured to alter said state of the head mounted display system based on a determination that the first and second eyes of the user are at least partially closed for longer than the threshold time.

Example 3: The display system of Example 2, wherein said threshold time is in the range from 500 milliseconds to 1.5 second.

Example 4: The display system of Example 2, wherein said threshold time in the range from 750 milliseconds to 2.0 seconds.

Example 5: The display system of Example 2, wherein said threshold time in the range from 1 second and 3 seconds.

Example 6: The display system of Example 2, wherein said threshold time in the range from 3 second and 10 seconds.

Example 7: The display system of Example 1, wherein the processing electronics are configured to alter said state of the head mounted display system based on a determination that the first and second eyes of the user transition from being in an opened state to being in an at least partially closed state at least a first time and a second time.

Example 8: The display system of Example 7, wherein said first and second times are separated by less than 3 seconds.

Example 9: The display system of Example 7, wherein said first and second times are separated by less than 2 seconds.

Example 10: The display system of Example 7, wherein said first and second times are separated by less than 1.5 seconds.

Example 11: The display system of Example 1, wherein the processing electronics are configured to alter said state of the head mounted display system based on a determination that the first and second eyes of the user transition from being in an opened state to being in an at least partially closed state at least three times, a first time, a second time, and a third time.

Example 12: The display system of Example 11, wherein said first and second times as well as said second and third times are separated by less than 3 seconds.

Example 13: The display system of Example 11, wherein said first and second times as well as said second and third times are separated by less than 2 seconds.

Example 14: The display system of Example 11, wherein said first and second times as well as said second and third times are separated by less than 1.5 seconds.

Example 15: The display system of any of the Examples above, wherein said processing electronics are configured to determine a gaze direction of said first and second eyes and use both said gaze direction and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 16: The display system of any of the Examples above, wherein said processing electronics are configured to determine a vergence of said first and second eyes and use both said vergence and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 17: The display system of any of the Examples above, wherein said processing electronics are configured to determine a gaze direction and a vergence of said first and second eyes and use said gaze direction, said vergence, and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 18: The display system of any of the Examples above, wherein said processing electronics are configured to display buttons, knobs, windows, menu items, or other regions toward which the user can direct their gaze to make a selection, said processing electronics being configured to identify said gaze direction of said first and second eyes and to use said gaze direction directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 19: The display system of any of the Examples above, wherein said processing electronics are configured to display buttons, knobs, windows, menu items, or other regions toward which the user can direct their gaze to make a selection, said processing electronics being configured to identify said gaze direction and the vergence of said first and second eyes and to use said gaze direction and vergence directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 20: The display system of any of the Examples above, wherein said processing electronics are configured to display buttons, knobs, windows, menu items, or other regions toward which the user can direct their gaze to make a selection, said processing electronics being configured to identify said the vergence of said first and second eyes and to use said vergence directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 21: The display system of any of the Examples above, wherein said processing electronics are configured to use glints on said first and second eyes to determine whether said first and second eyes are at least partially closed.

Example 22: The display system of any of the Examples above, wherein based on the determinations that the first and second eyes of the user are at least partially closed, the processing electronics are configured to alter a state of the head mounted display system so as to modify the virtual content presented to the user.

Example 23: The display system of any of the Examples above, wherein based on the determinations that the first and second eyes of the user are at least partially closed, the processing electronics are configured to alter a state of the head mounted display system so as to modify the manner in which virtual content is presented to the user.

Example 24: The display system of Example 23, wherein the manner in which virtual content is presented to the user includes the color of virtual content, the color palette used to provide color to virtual content, the position of virtual content, or movement of virtual content.

Example 25: The display system of any of the Examples above, wherein based on the determinations that the first and second eyes of the user are at least partially closed, the processing electronics are configured to alter a state of the head mounted display system so as to modify a performance feature of the head mounted display system apparent to the user.

Example 26: The display system of Example 25, wherein a performance feature of the head mounted display system apparent to the user includes audio characteristics.

Example 27: The display system of Example 26, wherein said audio characteristics include volume, which speaker a particular sound emanates from, balance between speakers, or any combination thereof.

Example 28: The display system of any of the Examples above, wherein said determination that causes said state to be altered is that said first and second eyes are partially closed.

Example 29: The display system of any of the Examples above, wherein said determination that causes said state to be altered is that said first and second eyes are squinting.

Example 30: The display system of any of the Examples above, wherein said determination that causes said state to be altered is that said first and second eyes are fully closed.

Example 31: The display system of any of the Examples above, wherein said determination that causes said state to be altered is that said first and second eyes are blinking.

Example 32: The display system of any of the the Examples above, said altering of said state of the head mounted display does not reduce power consumption of said head mounted display system.

Part II
  Example 1: A head mounted display system for displaying image content to a user, the display system comprising:
    at least one display configured to be worn by a user to present virtual content to first and second eyes of a user;
    a first inward facing camera configured to image the first eye of the user;
    a second inward facing camera configured to image the second eye of the user; and
    processing electronics in communication with the first and second inward-facing cameras and said at least one display, the processing electronics configured to:
      present virtual content to the user on said at least one display;
      using the first and second inward-facing cameras determine a vergance of said first and second eyes; and
      based on a determination of said vergence, alter a state of the head mounted display system so as to modify the virtual content presented to the user, the manner in which virtual content is presented to the user, a performance feature of the head mounted display system apparent to the user, or any combination thereof.
  Example 2: The display system of any of the Examples above, wherein said processing electronics are configured to determine a gaze direction of said eyes and based on said determination of said gaze direction and said vergence, alter said state of the head mounted display system so as to modify the virtual content presented to the user, the manner in which virtual content is presented to the user, a performance feature of the head mounted display system apparent to the user, or any combination thereof.
  Example 3: The display system of any of the Examples above, wherein said processing electronics are configured to use both said vergence and a determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.
  Example 4: The display system of any of the Examples above, wherein said processing electronics are configured to determine a gaze direction of said first and second eyes and that the first and second eyes of the user are at least partially closed and use said gaze direction, said vergence, and a determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.
  Example 5: The display system of any of the Examples above, wherein said processing electronics are configured to display buttons, knobs, windows, menu items, or other regions toward at an apparent distance from the user, and said processing electronics are configured to detect a vergence corresponding to said apparent distance of said buttons, knobs, windows, menu items, or other regions in identifying a command or selection to alter said state of the head mounted display system so as to modify the virtual content presented to the user, the manner in which virtual content is presented to the user, a performance feature of the head mounted display system apparent to the user, or any combination thereof.
  Example 6: The display system of any of the Examples above, wherein said processing electronics are configured to display buttons, knobs, windows, menu items, or other regions toward which the user can direct their gaze to make a selection, said processing electronics further being configured to identify the vergence of said first and second eyes and to use said gaze direction and vergence directed at said buttons, knobs, windows, menu items, or other regions in identifying a command or selection to alter said state of the head mounted display system so as to modify the virtual content presented to the user, the manner in which virtual content is presented to the user, a performance feature of the head mounted display system apparent to the user, or any combination thereof.
  Example 7: The display system of any of the Examples above, wherein based on the determined vergence, the processing electronics are configured to alter a state of the head mounted display system so as to modify the virtual content presented to the user.
  Example 8: The display system of any of the Examples above, wherein based on the on determined vergence, the processing electronics are configured to alter a state of the head mounted display system so as to modify the manner in which virtual content is presented to the user.
  Example 9: The display system of Example 8, wherein the manner in which virtual content is presented to the user includes the color of virtual content, the color palette used to provide color to virtual content, the position of virtual content, or movement of virtual content.
  Example 10: The display system of any of the Examples above, wherein based on the determined vergence, the processing electronics are configured to alter a state of the head mounted display system so as to modify a performance feature of the head mounted display system apparent to the user.
  Example 11: The display system of Example 10, wherein a performance feature of the head mounted display system apparent to the user includes audio characteristics.
  Example 12: The display system of Example 11, wherein said audio characteristics include volume, which speaker a particular sound emanates from, balance between speakers, or any combination thereof.
  Example 13: The display system of any of the Examples above, said altering of said state of the head mounted display does not reduce power consumption of said head mounted display system.
  Example 14: The display system of any of the Examples above, wherein said state is altered if said vergence is within a threshold distance from where virtual content appears to be displayed.
  Example 15: The display system of Example 14, wherein said threshold distance is a depth from where said virtual content appears to be displayed.
  Example 16: The display system of any of the Examples above, wherein said state is altered if said vergence is sufficiently close in depth to where virtual content appears to be displayed.
Part III
  Example 1: A virtual content display system, comprising:
    a graphics rendering module configured to prepare virtual content for display in a first render mode;
    a display bridge coupled to a left display and a right display aligning to a left and right user eye respectively, wherein the display bridge is configured to selectively display a left and right version of the prepared virtual content from the graphics rendering module on the respective left and right display;

left and right inward-facing sensors configured to detect an eye image status of a left and right user eye respectively; and processing electronics in communication with the left and right inward-facing sensors and the graphics rendering module, the processing electronics configured to:

transmit virtual content from the graphics rendering module to the display bridge in a first mode, detect a change in both left and right eye image status by the left and right inward-facing sensors, and change a render mode of virtual content, at the graphics rendering module.

Example 2: The display system of Example 1, wherein detecting a change in eye image status of both the left and right eye further comprises determining a time duration of the change.

Example 3: The display system of Example 2, wherein the time duration of the change in eye image status of both the left and right eye corresponds a first range of time.

Example 4: The display system of Example 3, wherein the first range of time has a lower limit of greater than zero seconds.

Example 5: The display system of Example 4, wherein changing the mode of virtual content corresponds to selecting a second render mode from a plurality of render modes.

Example 6: The display system of Example 5, wherein the second render mode is a change in color of at least one component of the virtual content.

Example 7: The display system of Example 6, wherein the processing electronics are further configured to display the virtual content according to the second render mode.

Example 8: The display system of Example 2, wherein the time duration of change in eye image status of both the left and right eye corresponds to a second range of time.

Example 9: The display system of Example 8, wherein the second range of time has a lower limit of one second.

Example 10: The display system of Example 9, wherein changing the mode of virtual content corresponds to selecting a third mode change from a plurality of mode changes.

Example 11: The display system of Example 10, wherein the third mode is a change in geometric render space of the virtual content.

Example 12: The display system of Example 11, wherein the change in geometric render space is to a second position.

Example 13: The display system of Example 12, wherein an audio signal of the virtual content is adjusted to originate from a virtual speaker position at the second position.

Example 14: The display system of Example 12, wherein the processing electronics are further configured to display the virtual content according to the second render mode.

Example 15: A virtual content display system, comprising:

a graphics rendering module configured to prepare virtual content for display in a first operating state;

a display bridge coupled to a left display and a right display aligning to a left and right user eye respectively, wherein the display bridge is configured to selectively display a left and right version of the prepared virtual content from the graphics rendering module on the respective left and right display;

left and right inward-facing sensors configured to detect an eye image status of a left and right user eye respectively; and processing electronics in communication with the left and right inward-facing sensors and the graphics rendering module, the processing electronics configured to:

transmit virtual content from the graphics rendering module to the display bridge in a first mode, determine a vergence point where a gaze direction of the left and right user eye intersect, and change, at the graphics rendering module, an operating state of virtual content that is co-located with the vergence point.

Example 16: The display system of Example 15, wherein changing the operating state of virtual content comprises selecting a second operating state from a predetermined list of operating states.

Example 17: The display system of Example 16, wherein the first operating state is a static display of the virtual content.

Example 18: The display system of Example 17, wherein the second operating state is an animated display of the virtual content.

Example 19: The display system of Example 18, wherein the processing electronics are further configured to change the operating state of the virtual content at the rendering module to the first operating state concurrent with the vergence point being a predetermined distance from the virtual content.

Example 20: The display system of Example 16, wherein the first operating state is a disabled interaction state.

Example 21: The display system of Example 20, wherein the second operating state is a user-input enabled state.

It will be appreciated that the drawings are provided to illustrate example implementations and are not intended to

DETAILED DESCRIPTION

Example Display Systems

Figure 1:
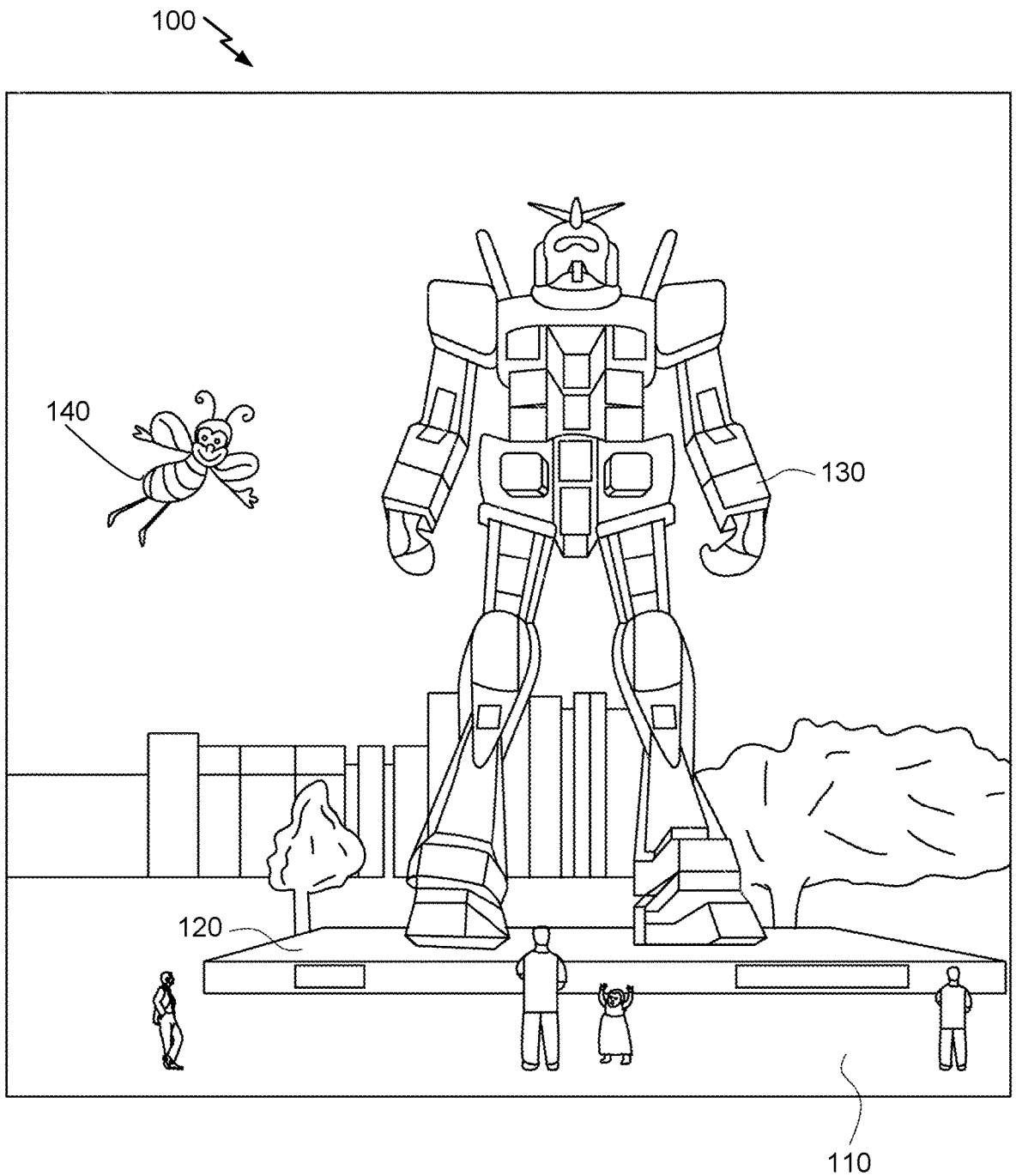
FIG. 1 illustrates a user's view of augmented reality (AR) through an AR device according to some implementations.

With reference to FIG. 1, an augmented reality scene 100 is depicted. It will be appreciated that modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. FIG. 1 shows an example of such a scene in which a user of an AR technology sees a real-world park-like setting 110 featuring people, trees, buildings in the background, and a concrete platform 120. In addition to these items, the user of the AR technology also perceives that he "sees" a robot statue 130 standing upon the real-world platform 120, and a cartoon-like avatar character 140 flying by which seems to be a personification of a bumble bee, even though these elements 130, 150 do not exist in the real world. Because the human visual perception system is complex, it is challenging to produce a VR or AR technology that facilitates a comfortable, natural-feeling, rich presentation of virtual image elements amongst other virtual or real-world imagery elements.

Figure 2:
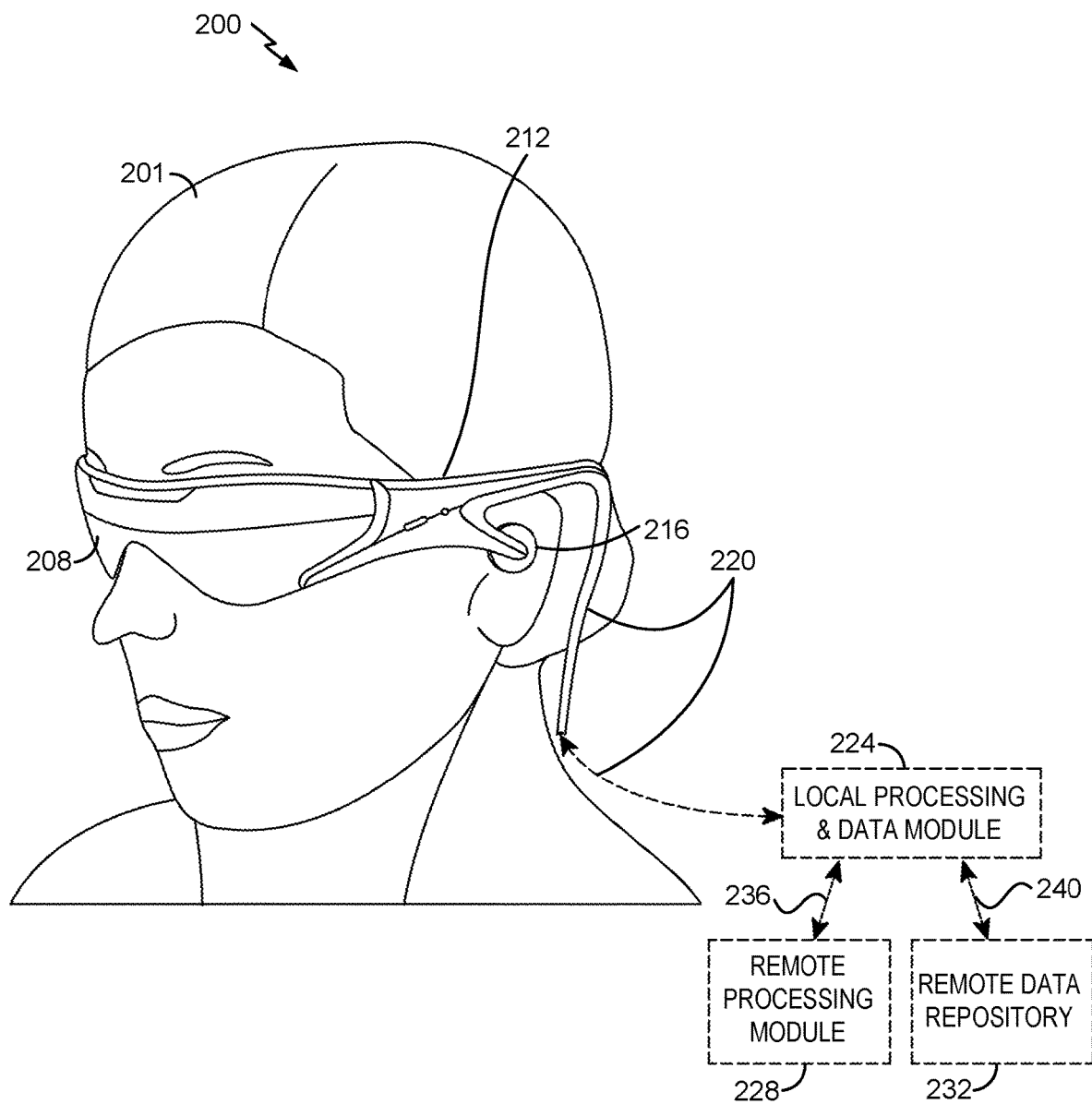
FIG. 2 illustrates an example of wearable display system according to some implementations.

FIG. 2 illustrates an example of wearable display system 200 (alternatively referred to as a "head mounted display" or "HMD" throughout this disclosure). The display system 200 includes a display 208, and various mechanical and electronic modules and systems to support the functioning of that display 208. The display 208 may be coupled to a frame 212, which is wearable by a display system user or viewer 201 and which is configured to position the display 208 in front of the eyes of the user 201. The display 208 may be considered eyewear in some implementations. In some implementations, a speaker 216 is coupled to the frame 212 and positioned adjacent the ear canal of the user 201 (in some implementations, another speaker, not shown, is positioned adjacent the other ear canal of the user to provide for stereo/shapeable sound control). In some implementations, the display system may also include one or more microphones (not shown) or other devices to detect sound. In some implementations, the microphone is configured to allow the user to provide inputs or commands to the system 200 (e.g., the selection of voice menu commands, natural language questions, etc.) and/or may allow audio communication with other persons (e.g., with other users of similar display systems).

With continued reference to FIG. 2, the display 208 is operatively coupled, such as by a wired lead or wireless connectivity, to a local data processing module 224 which may be mounted in a variety of configurations, such as fixedly attached to the frame 212, fixedly attached to a helmet or hat worn by the user, embedded in headphones, or otherwise removably attached to the user 201 (e.g., in a backpack-style configuration, in a beltcoupling style configuration). The local processing and data module 224 may comprise a hardware processor or processing electronics or circuitry, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 212 or otherwise attached to the user 201), such as image capture devices (such as cameras), microphones, inertial measurement units, accelerometers, compasses, GPS units, radio devices, and/or gyros; and/or b) acquired and/or processed using remote processing module 228 and/or remote data repository 232, possibly for passage to the display 208 after such processing or retrieval. The local processing and data module 224 may be operatively coupled by communication links 236, 240, such as via a wired or wireless communication links, to the remote processing module 228 and remote data repository 232 such that these remote modules 228, 232 are operatively coupled to each other and available as resources to the local processing and data module 224. In some implementations, the local processing and data module 224 may include one or more of the image capture devices, microphones, inertial measurement units, accelerometers, compasses, GPS units, radio devices, and/or gyros. In some other implementations, one or more of these sensors may be attached to the frame 212, or may be stand alone structures that communicate with the local processing and data module 224 by wired or wireless communication pathways.

With continued reference to FIG. 2, in some implementations, the remote processing module 228 may comprise one or more processors or processing electronics or circuitry configured to analyze and process data and/or image information. In some implementations, the remote data repository 232 may comprise a digital data storage facility, which may be available through the internet or other networking configuration in a "cloud" resource configuration. In some implementations, the remote data repository 232 may include one or more remote servers, which provide information, e.g., information for generating augmented reality content, to the local processing and data module 224 and/or the remote processing module 228. In some implementations, all data is stored and all computations are performed in the local processing and data module, allowing fully autonomous use from a remote module.

Figure 3:
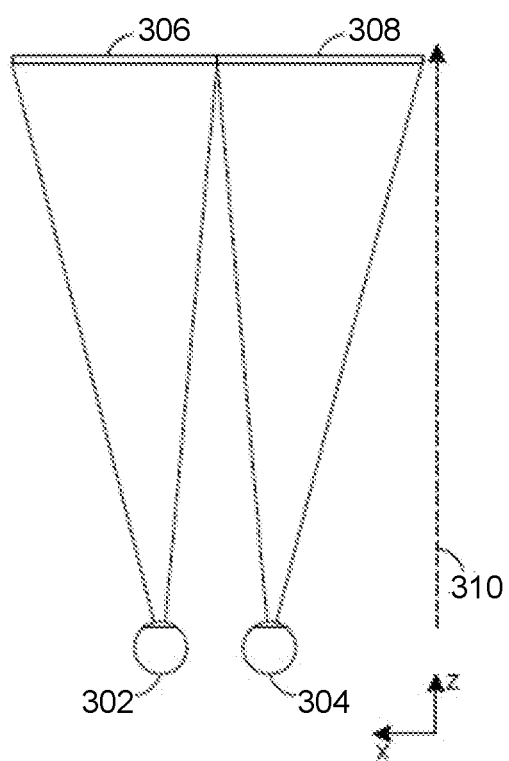
FIG. 3 illustrates a conventional display system for simulating three-dimensional imagery for a user according to some implementations.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 306, 308—one for each eye 302, 304—are outputted to the user. The images 306, 308 are spaced from the eyes 302, 304 by a distance 310 along an optical or z-axis parallel to the line of sight of the viewer. The images 306, 308 are flat and the eyes 302, 304 may focus on the images by assuming a single accommodated state. Such systems rely on the human visual system to combine the images 306, 308 to provide a perception of depth for the combined image.

It will be appreciated, however, that the human visual system is more complicated and providing a realistic perception of depth is more challenging. For example, without being limited by theory, it is believed that viewers of an object may perceive the object as being "three-dimensional" due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, a change in vergence of the eyes when shifting attention from one object to another object at a different distance will automatically cause a matching change in the focus of the lenses of the eyes, or accommodation of the eyes, under a relationship known as the "accommodation-vergence reflex." Likewise, a change in accommodation will trigger a matching change in vergence, under normal conditions. As noted herein, many stereoscopic or "3-D" display systems display a scene using slightly different presentations (and, so, slightly different images) to each eye such that a three-dimensional perspective is perceived by the human visual system. Such systems can be uncomfortable for many viewers, however, since they, among other things, simply provide a different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
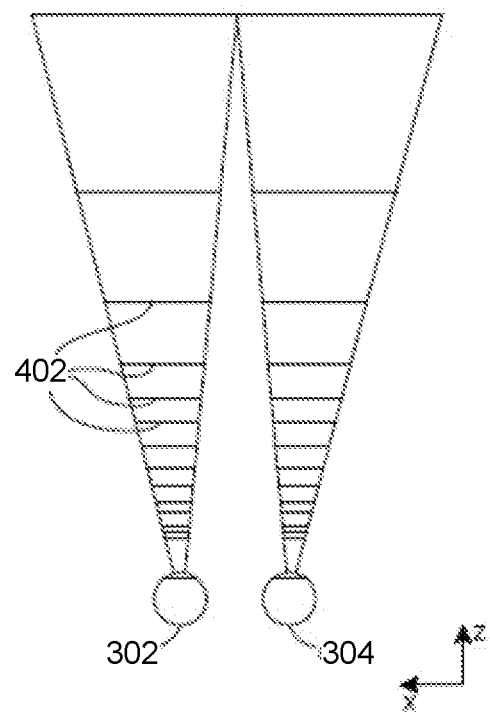
FIG. 4 illustrates aspects of an approach for simulating three-dimensional imagery using multiple depth planes according to some implementations.

FIG. 4 illustrates aspects of an approach for simulating three-dimensional imagery using multiple depth planes. Objects at various distances from eyes 302, 304 on the z-axis are accommodated by the eyes 302, 304 so that those objects are in focus. The eyes (302 and 304) assume particular accommodated states to bring into focus objects at different distances along the z-axis. Consequently, a particular accommodated state may be said to be associated with a particular one of depth planes 402, which has an associated focal distance, such that objects or parts of objects in a particular depth plane are in focus when the eye is in the accommodated state for that depth plane. In some implementations, three-dimensional imagery may be simulated by providing different presentations of an image for each of the eyes 302, 304, and also by providing different presentations of the image corresponding to each of the depth planes. While shown as being separate for clarity of illustration, it will be appreciated that the fields of view of the eyes 302, 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
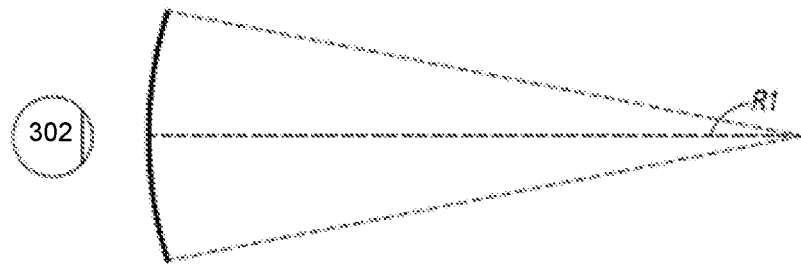
FIGS. 5A-5C illustrate relationships between radius of curvature and focal radius according to some implementations.
Figure 5B:
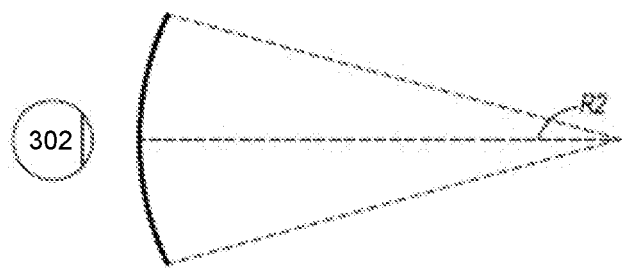
Figure 5C:
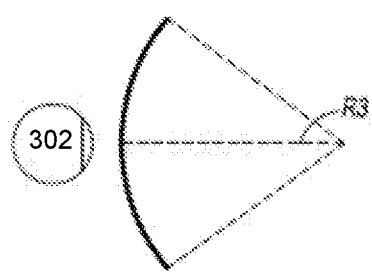

The distance between an object and the eye 302 or 304 can also change the amount of divergence of light from that object, as viewed by that eye. FIGS. 5A-5C illustrate relationships between distance and the divergence of light rays. The distance between the object and the eye 302 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 302. Consequently, at different depth planes, the degree of divergence of light rays is also different, with the degree of divergence increasing with decreasing distance between depth planes and the viewer's eye 302. While only a single eye 302 is illustrated for clarity of illustration in FIGS. 5A-5C and other figures herein, it will be appreciated that the discussions regarding eye 302 may be applied to both eyes 302 and 304 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
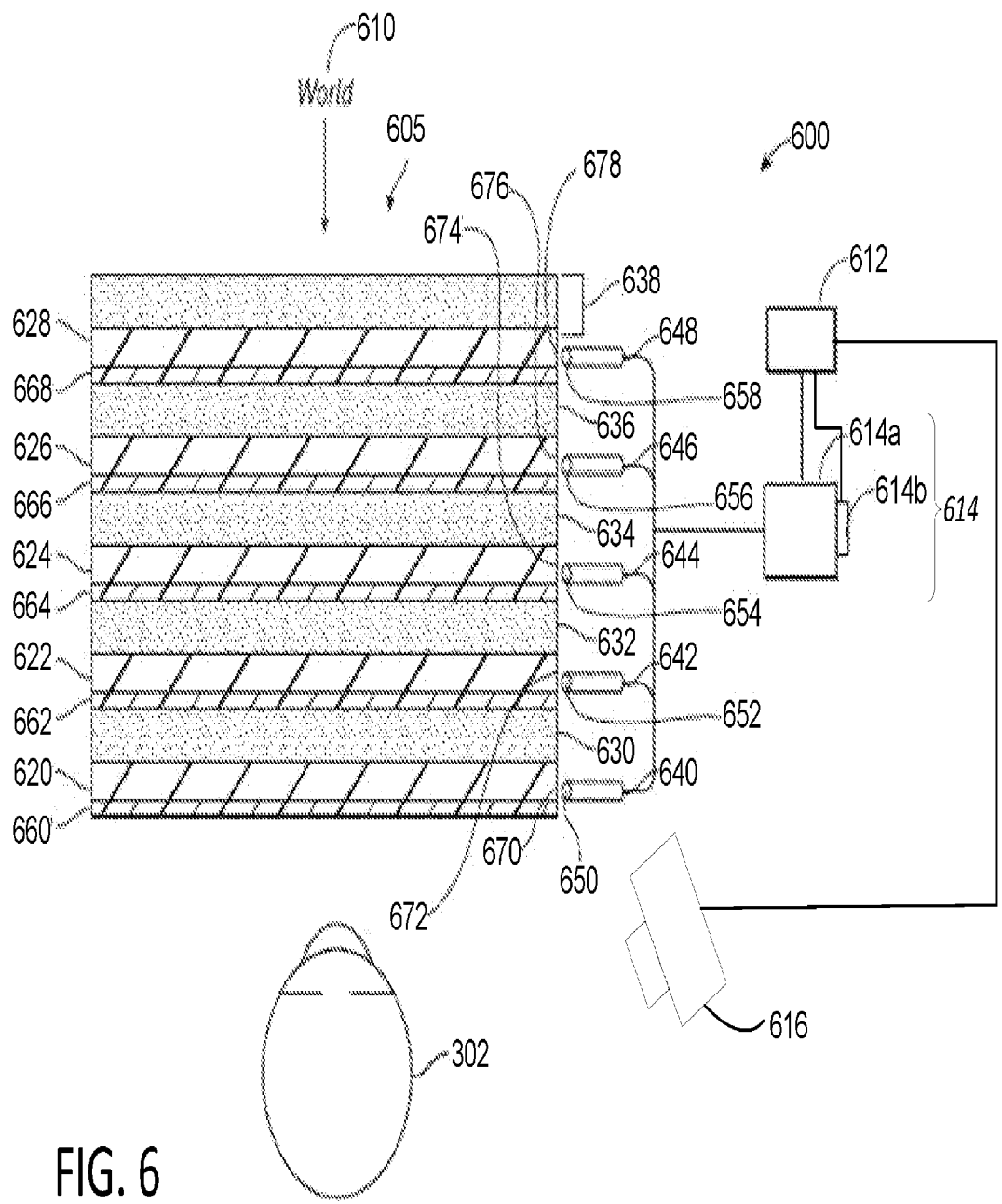
FIG. 6 illustrates an example of a waveguide stack for outputting image information to a user according to some implementations.

FIG. 6 illustrates an example of a waveguide stack for outputting image information to a user. A display system 600 includes a stack of waveguides, or stacked waveguide assembly, 605 that may be utilized to provide three-dimensional perception to the eye/brain using a plurality of waveguides 620, 622, 624, 626, 628. In some implementations, the display system 600 is the system 200 of FIG. 2, with FIG. 6 schematically showing some parts of that system 200 in greater detail. For example, the waveguide assembly 605 may be part of the display 208 of FIG. 2.

With continued reference to FIG. 6, the waveguide assembly 1240 may also include a plurality of features 630, 632, 634, 636 between the waveguides. In some implementations, the features 630, 632, 634, 636 may be lenses. The waveguides 620, 622, 624, 626, 628 and/or the plurality of lenses 630, 632, 634, 636 may be configured to send image information to the eye with various levels of wavefront curvature or light ray divergence. Each waveguide level may be associated with a particular depth plane and may be configured to output image information corresponding to that depth plane. Image injection devices 640, 642, 644, 646, 648 may function as a source of light for the waveguides and may be utilized to inject image information into the waveguides 620, 622, 624, 626, 628, each of which may be configured, as described herein, to distribute incoming light across each respective waveguide, for output toward the eye 302. By using different sources the light sources themselves act to switch depth planes by switching on or off the illumination for each depth plane, as desired. Light exits an output surface 650, 652, 654, 656, 658 of the image injection devices 640, 642, 644, 646, 648 and is injected into a corresponding input surface 670, 672, 674, 676, 678 of the waveguides 620, 622, 624, 626, 628. In some implementations, the each of the input surfaces 670, 672, 674, 676, 678 may be an edge of a corresponding waveguide, or may be part of a major surface of the corresponding waveguide (that is, one of the waveguide surfaces directly facing the world 610 or the viewer's eye 302). In some implementations, a single beam of light (e.g. a collimated beam) may be injected into each waveguide to output an entire field of cloned collimated beams that are directed toward the eye 302 at particular angles (and amounts of divergence) corresponding to the depth plane associated with a particular waveguide. In some implementations, a single one of the image injection devices 640, 642, 644, 646, 648 may be associated with and inject light into a plurality (e.g., three) of the waveguides 620, 622, 624, 626, 628.

In some implementations, the image injection devices 640, 642, 644, 646, 648 are discrete displays that each produce image information for injection into a corresponding waveguide 620, 622, 624, 626, 628, respectively. In some implementations, for example, the image injection devices 640, 642, 644, 646, 648 comprise scanning fibers or scanning fiber display devices. In some other implementations, the image injection devices 640, 642, 644, 646, 648 are the output ends of a single multiplexed display which may, e.g., pipe image information via one or more optical conduits (such as fiber optic cables) to each of the image injection devices 640, 642, 644, 646, 648. It will be appreciated that the image information provided by the image injection devices 640, 642, 644, 646, 648 may include light of different wavelengths, or colors (e.g., different component colors).

In some implementations, the light injected into the waveguides 620, 622, 624, 626, 628 is provided by a light output module 614, which may include a light source, such as backlight 614b. The backlight 614b may comprise one or more emitters such as one or more light-emitting diodes (LEDs). The light from the backlight 614b may be modified by a light modulator 614a, e.g., a spatial light modulator. The light modulator 614a may be configured to change the perceived intensity of the light injected into the waveguides 620, 622, 624, 626, 628. Examples of spatial light modulators include liquid crystal displays (LCD) and a digital light processing (DLP) displays. In some implementations, the light output module may include one or more light guides, light pipes or reflectors, which are configured to direct light from the emitter (e.g., by transmitting and/or reflecting the light) to the light modulator 614a.

A controller 612 controls the operation of one or more of the stacked waveguide assembly 1240, including operation of the image injection devices 640, 642, 644, 646, 648, the light emitter 614b, and/or the light modulator 614a. In some implementations, the controller 612 is part of the local data processing module 224. The controller 612 includes programming (e.g., instructions in a non-transitory medium) that regulates the timing and provision of image information to the waveguides 620, 622, 624, 626, 628 according to, e.g., any of the various schemes disclosed herein. In some implementations, the controller 612 may be configured to control the operations and/or received input from one or more cameras or sensors (e.g., an inward-facing camera) that image an eye of a user, wherein the operation of the light emitter 614b and/or light modulator 614a may be based at least in part upon images of the eye and/or associated image data, such as the determination of when the eye is blinking or moving. In some implementations, the controller may be a single integral device, or a distributed system connected by wired or wireless communication channels. The controller 612 may be part of the processing modules or electronics 224 or 228 (FIG. 2) and/or other processing electronics and circuitry in some implementations.

With continued reference to FIG. 6, the waveguides 620, 622, 624, 626, 628, 190 may be configured to propagate light within each respective waveguide by total internal reflection (TIR). The waveguides 620, 622, 624, 626, 628 may each be planar or have another shape (e.g., curved), with major top and bottom surfaces and edges extending between those major top and bottom surfaces. In the illustrated configuration, the waveguides 620, 622, 624, 626, 628 may each include outcoupling optical elements 660, 662, 664, 666, 628 that are configured to extract light out of a waveguide by redirecting the light propagating within each respective waveguide, out of the waveguide to output image information to the eye 4. Extracted light may also be referred to as outcoupled light and the outcoupling optical elements may also be referred to light extracting optical elements. An extracted beam of light may be outputted by the waveguide at locations at which the light propagating in the waveguide strikes a light extracting optical element. The outcoupling optical elements 660, 662, 664, 666, 628 may, for example, be gratings, including diffractive optical features, as discussed further herein. While illustrated as disposed at the bottom major surfaces of the waveguides 620, 622, 624, 626, 628 for case of description and drawing clarity, in some implementations, the outcoupling optical elements 660, 662, 664, 666, 628 may be disposed at the top and/or bottom major surfaces, and/or may be disposed directly in the volume of the waveguides 620, 622, 624, 626, 628, as discussed further herein. In some implementations, the outcoupling optical elements 660, 662, 664, 666, 628 may be formed in a layer of material that is attached to a transparent substrate to form the waveguides 620, 622, 624, 626, 628. In some other implementations, the waveguides 620, 622, 624, 626, 628 may be a monolithic piece of material and the outcoupling optical elements 660, 662, 664, 666, 628 may be formed on a surface and/or in the interior of that piece of material.

With continued reference to FIG. 6, as discussed herein, each waveguide 620, 622, 624, 626, 628 is configured to output light to form an image corresponding to a particular depth plane. For example, the waveguide 620 nearest the eye may be configured to deliver collimated light, as injected into such waveguide 620, to the eye 302. The collimated light may be representative of the optical infinity focal plane. The next waveguide up 622 may be configured to send out collimated light which passes through the first lens 630 (e.g., a negative lens) before it can reach the eye 302; such first lens 630 may be configured to create a slight convex wavefront curvature so that the eye/brain interprets light coming from that next waveguide up 622 as coming from a first focal plane closer inward toward the eye 302 from optical infinity. Similarly, the third up waveguide 624 passes its output light through both the first 630 and second 632 lenses before reaching the eye 302; the combined optical power of the first 630 and second 632 lenses may be configured to create another incremental amount of wavefront curvature so that the eye/brain interprets light coming from the third waveguide 624 as coming from a second focal plane that is even closer inward toward the person from optical infinity than was light from the next waveguide up 622.

The other waveguide layers 626, 628 and lenses 634, 636 are similarly configured, with the highest waveguide 628 in the stack sending its output through all of the lenses between it and the eye for an aggregate focal power representative of the closest focal plane to the person. To compensate for the stack of lenses 630, 632, 634, 636 when viewing/interpreting light coming from the world 610 on the other side of the stacked waveguide assembly 605, a compensating lens layer 638 may be disposed at the top of the stack to compensate for the aggregate power of the lens stack 630, 632, 634, 636 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative implementations, either or both may be dynamic using electro-active features.

In some implementations, two or more of the waveguides 620, 622, 624, 626, 628 may have the same associated depth plane. For example, multiple waveguides 620, 622, 624, 626, 628 may be configured to output images set to the same depth plane, or multiple subsets of the waveguides 620, 622, 624, 626, 628 may be configured to output images set to the same plurality of depth planes, with one set for each depth plane. This can provide advantages for forming a tiled image to provide an expanded field of view at those depth planes.

With continued reference to FIG. 6, the outcoupling optical elements 660, 662, 664, 666, 628 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 660, 662, 664, 666, 628, which output light with a different amount of divergence depending on the associated depth plane. In some implementations, the light extracting optical elements 660, 662, 664, 666, 628 may be volumetric or surface features, which may be configured to output light at specific angles. For example, the light extracting optical elements 660, 662, 664, 666, 628 may be volume holograms, surface holograms, and/or diffraction gratings. In some implementations, the features 630, 632, 634, 636 may not be lenses; rather, they may simply be spacers (e.g., cladding layers and/or structures for forming air gaps).

In some implementations, the outcoupling optical elements 660, 662, 664, 666, 628 are diffractive features that form a diffraction pattern, or "diffractive optical element" (also referred to herein as a "DOE"). In various implementations, the DOE's have a sufficiently low diffraction efficiency so that only a portion of the light of the beam is deflected away toward the eye 302 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 302 for this particular collimated beam bouncing around within a waveguide.

In some implementations, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

Figure 7:
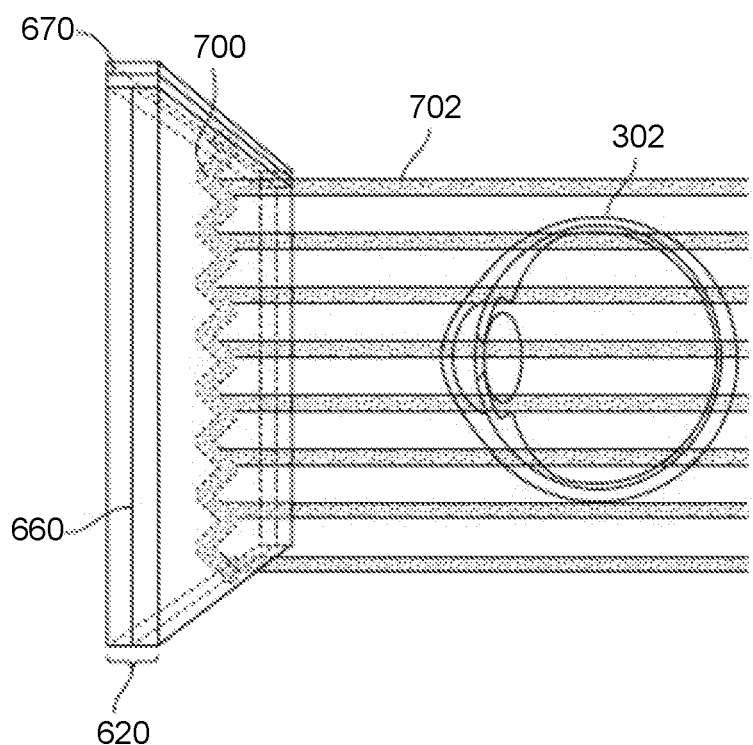
FIG. 7 illustrates an example of exit beams outputted by a waveguide according to some implementations.

FIG. 7 shows an example of exit beams outputted by a waveguide. One waveguide is illustrated, but it will be appreciated that other waveguides in the waveguide assembly 605 may function similarly, where the waveguide assembly 605 includes multiple waveguides. Light 700 is injected into the waveguide 620 at the input surface 670 of the waveguide 620 and propagates within the waveguide 620 by TIR. At points where the light 700 impinges on the DOE 660, a portion of the light exits the waveguide as exit beams 702. The exit beams 7 are illustrated as substantially parallel but, as discussed herein, they may also be redirected to propagate to the eye 302 at an angle (e.g., forming divergent exit beams), depending on the depth plane associated with the waveguide 620. It will be appreciated that substantially parallel exit beams may be indicative of a waveguide with outcoupling optical elements that outcouple light to form images that appear to be set on a depth plane at a large distance (e.g., optical infinity) from the eye 302. Other waveguides or other sets of outcoupling optical elements may output an exit beam pattern that is more divergent, which would require the eye 302 to accommodate to a closer distance to bring it into focus on the retina and would be interpreted by the brain as light from a distance closer to the eye 302 than optical infinity.

Figure 8:
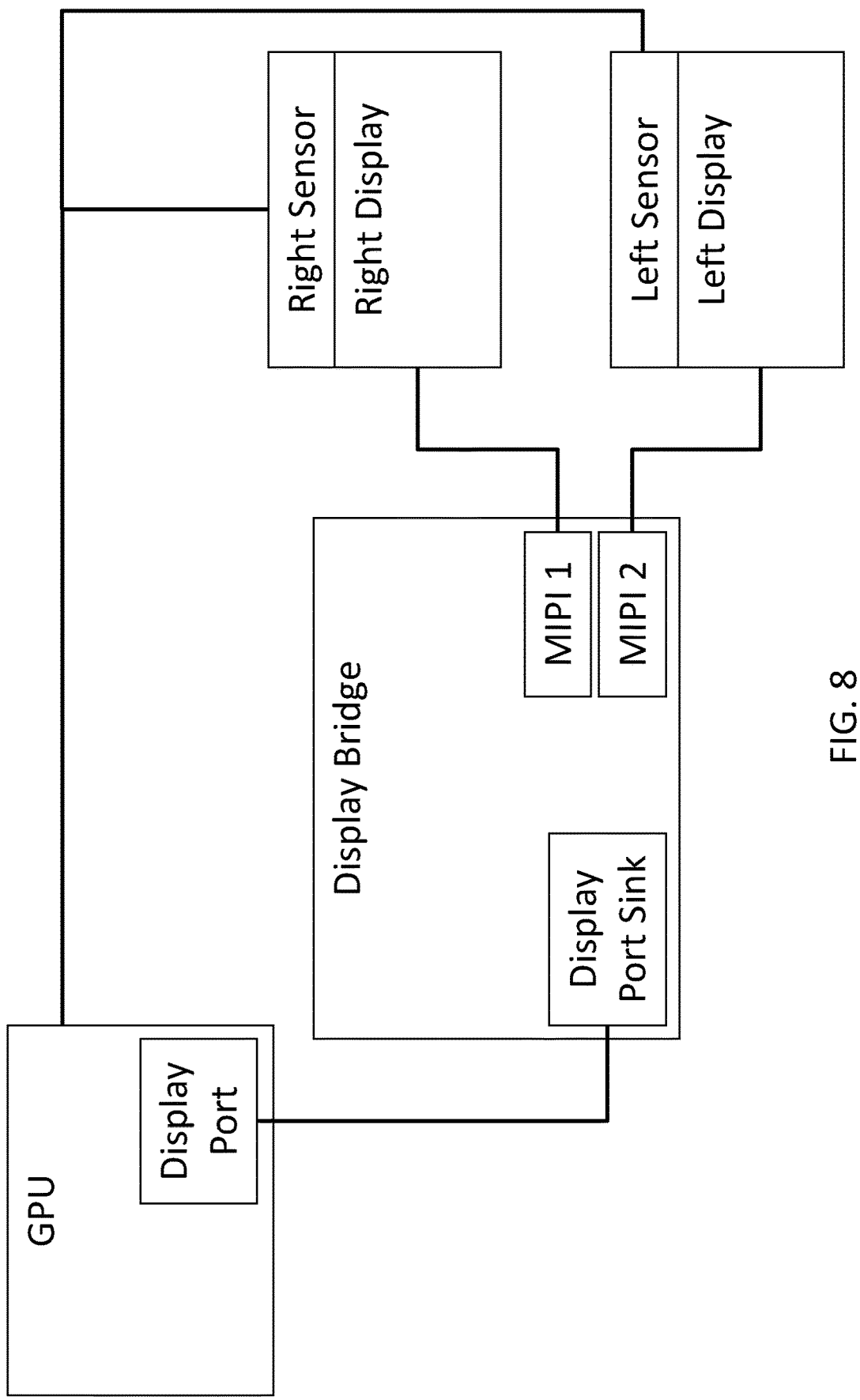
FIG. 8 illustrates an example of a render pipeline for displaying virtual content to a user according to some implementations.

FIG. 8 illustrates an example display pipeline according to some implementations. A main processor graphics processing unit (GPU) creates virtual content for rendering by the wearable display device. Rendering virtual content may comprise preparing content in a first mode (for example, having a chromatic pattern mode or location mode for display by the wearable display device) and/or a first operating state (for example, configured for display of content in a static presentation or static functionality wherein it does not receive inputs or commands). The GPU may port data to a display bridge which then splits the rendered virtual content into left and right display data going over a MIPI interface. Left and right display data may correspond to the rendered virtual content for display to a respective eye. For example, if virtual content were to appear substantially in front of a user, that content would appear slightly warped as between how the left eye should perceive it and how the right eye should perceive it; despite a common rendering, the actual display information may differ. Additionally, if virtual content is to appear far to the left/right of the user such that it is out of view, the GPU may still render such content though the display bridge will not forward the same to a respective display.

In some implementations of augmented reality or virtual reality devices, such as described herein, a camera (or other method) may be used to track eye movement or detect eye image status information. In some cases, this eye tracking may be done, for example, in order to adjust the view or mode of content being displayed by the display system 600. The display system 600 may comprise an inward facing camera 616 directed inward to the face of the user, and in particular, toward the eye of the user (e.g., the eye 302). For example, the camera 616 may be used to capture images of the eye 302 from which a state or position of the eye pupil or iris can be tracked. The state or position of the eye pupil or iris may be used to determine where the user of the device is looking, allowing for the display to be adjusted and/or the nature of the presentation operating state to change.

In some implementations, eye tracking can be used to determine a particular metric of the user's eye. For example, eye tracking may be used to infer, from whether the inward facing cameras detect an eye image, when the user is blinking or otherwise closing their eyes.

Figure 9:
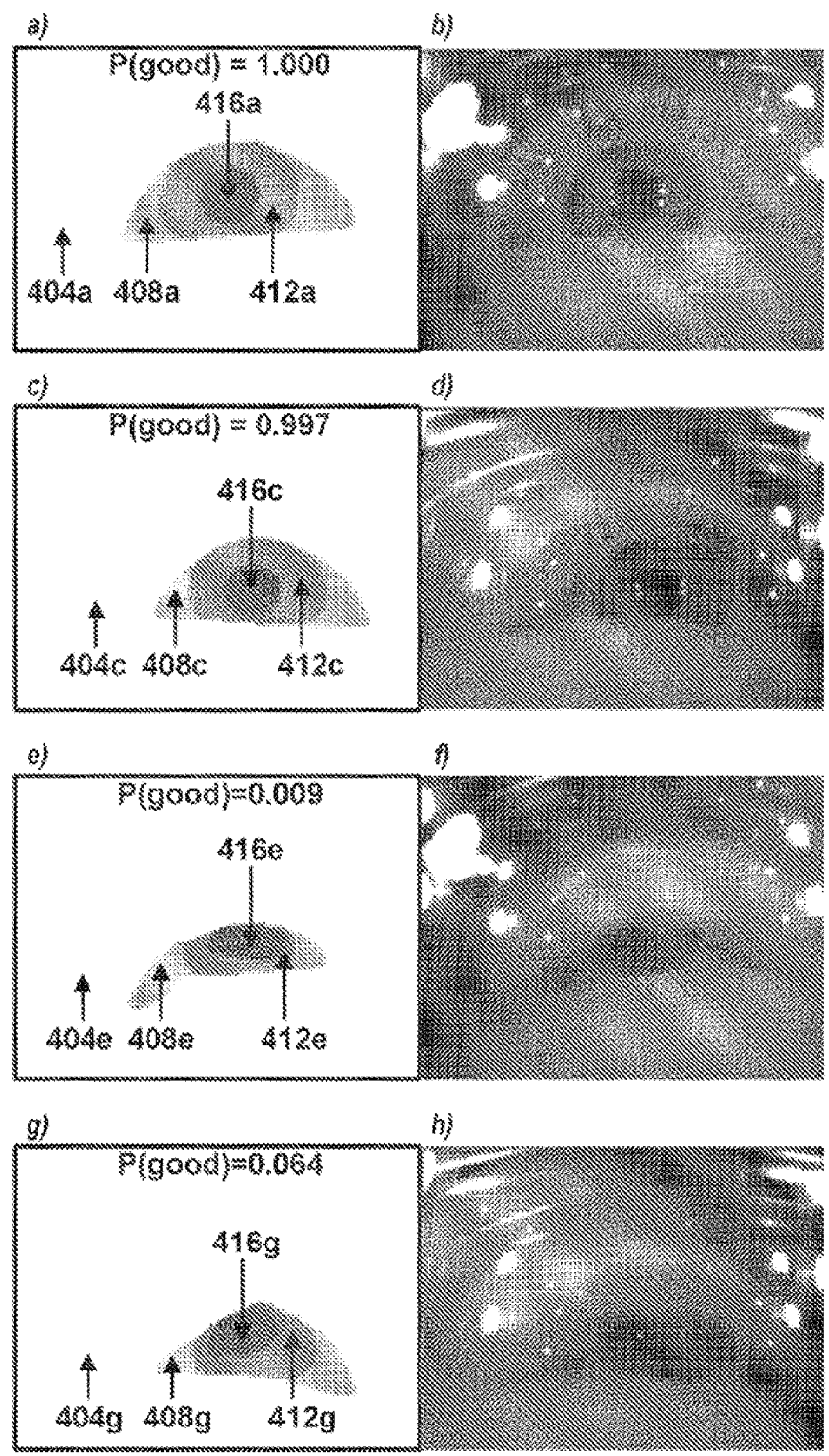
FIG. 9. illustrates partial blink detection techniques.

In some implementations, the eye tracking camera or inward facing camera (or other sensor or sensor system) can be used to determine if the user has closed their eyes by determining if the pupil or iris of the user is partially or fully blocked from view. FIG. 9 illustrates such principles. For example, the cameras may track the iris 412*a* of the user's eyes as darker circles within a brighter background (e.g., the eye white or sclera 408*a* of the user). Alternatively, the cameras may track the pupils 416*a* of the user as darker circles within a brighter iris 412*a*. Additional details regarding segmenting images of the eye can be found in U.S. patent application Ser. No. 15/605,567, published as U.S. Patent Publication 2018/0089834 titled "Neural Network for Eye Image Segmentation an Image Quality Estimation," which is hereby incorporated by reference herein in its entirety.

When the user has closed their eyes, some or all of the circle defined by the iris 412*a* or pupil 416*a* may be obscured or cut off. The controller 612 may "graphically" detect the eye closure in response to the circle pattern corresponding to the user's iris or pupil being partially or totally missing. For example, in some implementations, how much of the circle pattern is visible may be compared against a threshold value, wherein the user is determined to be blinking and closed if the amount of visible (e.g., circle) pattern does not meet the threshold value. In some implementations, the threshold value may be preconfigured based upon user trials.

In some implementations, light from discrete light sources, such as infrared light, are projected on a user's eye to produce a glint pattern. In some implementations, a closure of a user's eyes, such as for a blink, may be inferred from an eyelid's disruption of the glint pattern (e.g., occlusion of the corresponding glint), which would otherwise reflect from the cornea and/or lens of the eye and detected (e.g., with the eye tracking camera(s)).

Deliberate eye gestures may be used to interact or communicate with the display system. In particular, various eye gestures as well as more passive changes in eye status can be used as a signal by the wearer to the display system. Example eye gestures as well as more passive changes in eye status can include a partial or full closing of one or more eyes (e.g., blink, wink, squint). Multiple partial or full closings of one or both eyes (e.g., blinks, winks, squints) and the number of such occurrences (e.g., 2, 3, 4, etc.) may be used to identify a particular gesture. Similarly, the timing such as duration of time for which the eye is closed and/or open as well as the time period between multiple partial or full closings of one or both eyes (e.g., blinks, winks, squints) may be identified as a particular gesture. Additionally, the one or more gestures as well as more passive changes in eye status can include a change in one or more eye direction, a change in vergence or a point of focus of one or more eyes, a change in direction of focus, a motion of one eye relative to the other, and/or any other intentional change in state of the user's eye used as a signal or indication by the user. One or more of the eye gestures can be combined within a threshold of time for the signal to initiate. For example, the user closing their eyes (e.g., one or both eyes) for longer than a threshold period of time (e.g., longer than 500 ms, 1, 1.5 sec., 2, 2.5, 3, 5 seconds, or any range between any of these values may correspond to a gesture or eye status recognized by the system as a signal. Additionally, closing one or both eyes for less than a first amount of time can send a first signal while closing one's eyes for longer than a second amount of time can send a second signal. Also in some implementations, closing one or both eyes for more than a first amount of time but less than a second amount of time can send a first signal while closing one's eyes for longer than a second amount of time can send a second signal. Additionally or alternatively, as will be discussed below fixating on a point for longer than a certain amount of time possibly coupled with partial or full closings of one or both eyes (e.g., blinks, winks, squints) can be a recognizable gesture that may indicate a particular signal being communicated to the display system.

In some implementations, a time period of an eye closure is measured and compared with heuristic norms. For example, to distinguish a deliberate eye closure as an input means from simple squinting or partial eye closures, a duration of the change in eye image status is evaluated against a predetermined period of time. The predetermined period of time may be determined based upon empirical data from user studies. In some implementations, a time period for an eye closure may be measured by one or more sensors of the display system 600 (e.g., the inward facing camera 616). Such camera(s) may image the eye. In some implementations, any duration of not detecting a user's eyes or portion thereof (e.g., retina, iris, pupil) is interpreted as an eye closure. In some implementations, any time greater than zero seconds may be determined to be a change in eye status.

In some implementations, to distinguish a simple (e.g., involuntary or unconscious) blink or wink from a more deliberate eye status change, a first range of time for eye image status change may be employed. For example, the first range of time may be more than 100 ms, 250 ms, 500 ms, 750 ms or 1 s or any range between any of these values. In some implementations, even more deliberate eye image status detections may involve a measured eye closure of at least or longer than 1 s. Other time thresholds may be required, such as at least 1 s, 1.5 s, 2 s, 2.5 s, 3 s, 4 s, 5 s, 7 s, 10 s, or any number therebetween, or may fall within a range having endpoints therein (e.g., between 2 s and 4 s or between 1 and 1.5 s, etc.).

Figure 10:
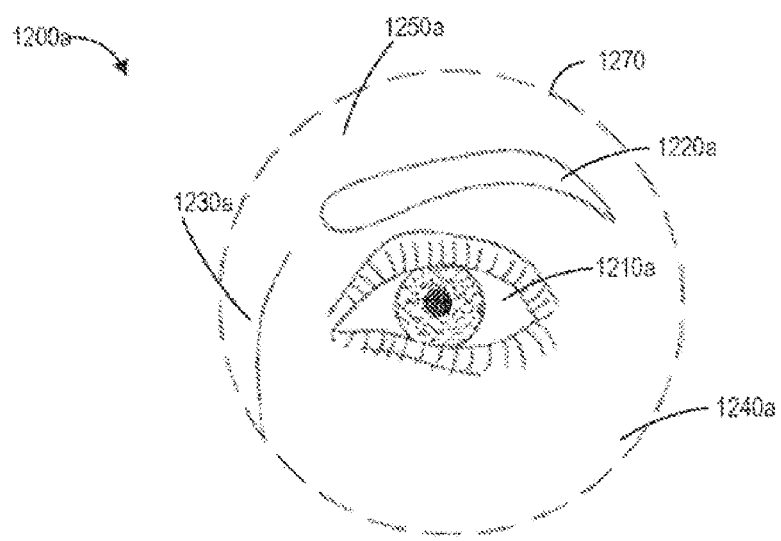
FIG. 10. illustrates feature detection within an eye image for status detection.

Although the above discussion refers primarily to using a camera to determine a status of the user's eye being detected (as opposed to not substantially detecting eye features such as sclera, iris, etc.), any type of hardware that can be used to detect a state of the user's eye and/or gaze directions may be used, such as other types of sensor systems like fiber scanning displays or infrared detectors. In some cases, it may be desirable to utilize hardware already integrated with display system 600 (e.g., hardware designed to serve other purposes in the display system 600), in order to reduce power consumption that would be consumed by the addition of new hardware. For example, eye tracking camera(s) used for eye tracking may be employed. The camera 616 or other type of sensor system is not limited to sensing visible light. For example, the camera 616 may sense infrared (IR) light and/or may include one or more depth sensitive sensors. FIG. 10 illustrates example features for detection by eye tracking sensors. In various implementations, however, the camera capture images of the eye that are processed to determine the state of the eye, for example, whether the eye is open, closed or partially closed and the duration of the open, closed, and/or partially closed states as well as possible the duration between closed or partially closed states.

FIG. 10 illustrates an example image 1200a of a periocular region 1270 comprising one eye 1210a, such as could be obtained from an eye tracking camera configured to determine an eye image status such as the presence of the eye. An eye image status of eye 1210a may have characteristics such as, for example, shape, size, pupil location, shape and folds of the eyelid, texture of skin around the eyeball, and so forth. In some implementations, the feature detection is a binary detection of presence or not of said feature. For example, in some implementations, eye closure may be detected by not detecting the presence of a pupil or a glint. Other more sophisticated eye closure status detections may be created, such as detecting certain eyelid positions in combination of occlusion or partial occlusion of iris, sclera, glint reflections, etc.

In various implementations, the wearable device can detect a periocular feature 1210a and associated characteristics using neural network or visual keypoints techniques such as scale-invariant feature transform (SIFT), speeded up robust features (SURF), oriented FAST and rotated BRIEF (ORB), binary robust invariant scalable keypoints (BRISK), fast retina keypoint (FREAK), etc., or any combination or variant of these. Other techniques may also be employed.

Figure 11:
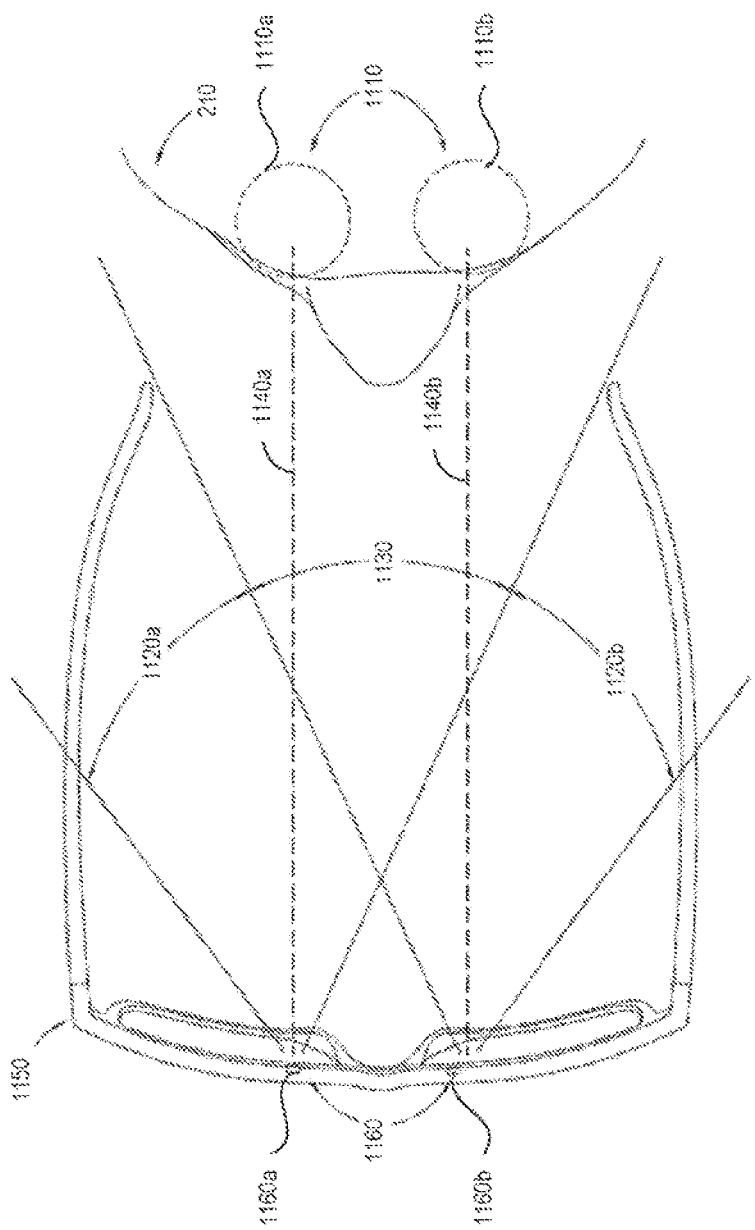
FIG. 11 illustrates an eye image status detection system according to some implementations.

FIG. 11 illustrates an example wearable device which can acquire images of the user's eyes, e.g., to determine a vergence point, or where respective vectors of a direction an eye is looking will converge with the other. Such vergance or directions can be used as indicators to provide commands, selections, instructions, or other input to the system or may be used in conjunction with other gestures such as eye gestures like partially or fully closing of the eye (e.g., blinks, winks, squints). The wearable device 1150 can be an example head-mounted device (HMD) as described with reference to FIG. 2.

The wearable device 1150 can include an imaging system 1160 which can be configured to detect an image of one or both of the user's eyes 1110. For example, the imaging system 1160 may include sensors such as eye cameras (eye camera 1160a and eye camera 1160b) configured to image the user's eyes 1110 while the user 210 is wearing the wearable device 1150. These cameras may comprises video cameras configured to obtain images (e.g., video or still) of the eyes and/or periocular region. In some implementaitons, these sensors (e.g., cameras) may be mounted forward of the face or eye and be directed toward the face and/or eye. In various implementations such cameras are mounted on the frame possible surrounding the eyepieces. Alternatively, the cameras may be mounted on the arms or temples. The wearable device 1150 can also include other types of sensors such as, e.g., inertial measurement units, pressure sensors, proximity sensors, etc. One or more of these sensors can be disposed on the frame of the wearable device 1150 (e.g., on one or both car stem).

As shown in FIG. 11, the imaging system 1160 points toward the head (e.g., face, eyes) of the user 210. The eye camera 1160a may be configured to image the eye 1110a while the eye camera 1160b may be configured to image the eye 1110b. Accordingly, in any implementations disclosed herein, first and second eye cameras 1160a may be designed to image the first and second eyes of the user respectively (with the first camera imaging more of the first eye than the second eye and the second camera imaging more of the second eye than the first eye). For example, respective left and right eye cameras may be employed to image the left and right eyes, respectively. Likewise, respective left and right eye sensors may be employed to monitor the left and right eyes, respectively. In this figure, the optical axis 1140a of the eye camera 1160a is parallel to the optical axis 1140b of the eye camera 1160b. The cameras, however, may be oriented different and need not be directed in the same direction.

Although the example described in FIG. 11 illustrates two eye cameras (in this example, one camera per eye), wearable device 1150 is not required to have two eye cameras. In some implementations, the imaging system 1160 may include one eye camera imaging the user's face. The one eye camera may be configured to image the periocular region associated with one eye or the periocular regions for both eyes. In other implementations, the wearable device 1150 may include more than two eye cameras.

As discussed above, a eye gesture or cue may comprise closing one eye (e.g., wink) or both eyes (e.g. blink). The eye or eyes may be fully closed or partially closed (e.g., when squinting). As discussed above, the eye gesture or cue may comprise closing the eye or eye for an extended period of time, for example, longer than a typical blink. Such period of time may be more than 100 ms, 250 ms, 500 ms, 750 ms, 1 s, 1.5 s, 2.0 s, 2.5 s, 3 s, or more or any range between any of these values. The eye gesture or cue may comprise closing or partially closing the eye or eyes (e.g., blink, wink, squint) multiple times (e.g., 2 times, 3 times, 4 times, 5 times, 6 times, 8 times, 10 times, or any range between any of these values). In some implementations, to distinguish such closure or partial closure of the eye (e.g., blinks, winks, squints) from involuntary blinking, the time between consecutive closures or partial closures (e.g., blinks, winks, squints) is measured. This time may for example be shorter than a certain threshold to be distinguished from involuntary blinking. The time between two consequitive involuntary blinks may, for example, be 1 second, 1.5 second, 2 second, 3 second, 4 second, 5 second or possibly more or any range between any of these values. Accordingly, the eye gesture or cue may comprise two or more (e.g., 3, 4, 5, etc.) blinks with less than a 1 s, 2 s, 3 s, 4 s between consequitive blinks. Likewise in an example implementation, the system may recognize as a gesture or cue a series of two blinks (e.g. full closure or partial closure or both eyes) separated by less than 0.5 s, or 1 s or 1.5 s, 2 s etc. In other implementations, a series (e.g, 2, 3, or more) partial closures (e.g., squints) of both eye comprise an eye gesture recognized by the system to indicate a particular command. In other implementations, a series (e.g., 2, 3, or more) closures or partial closures (e.g., winks) of one eye alone comprise an eye gesture recognized by the system to indicate a particular command. Closure or partial closure of the left eye may correspond to a different command than full or partial closure of the right eye. Similarly, a full or partial closure of the eye that lasts a period of time longer than a threshold amount of time (e.g., a first threshold duration) may correspond to a gesture, cue or indication of eye status correspondingly to be recognized by the system as an input (e.g., first input) and trigger a response (e.g., first response) by the system. For example, the user may close both eyes (e.g., blink) longer than a normal involuntary blink, e.g., 0.5 second, 1 second, 2 second, etc. Likewise in other implementations, the user may partially close both eyes (e.g., squint) longer than a normal involuntary blink, e.g., 0.5 second, 1 second, 2 second, etc. Additionally, if the eyes are closed (or partially closed) longer than a second threshold amount of time that is longer than the first threshold amount of time, such action may be interpreted as a second signal and may trigger a second response by the system different from the first response triggered by the first input interpreted by the system.

In other implementations, the user may close only one eye (e.g., wink) longer than a normal involuntary blink, e.g., 0.5 second, 1 second, 2 second, etc. In other implementations, the user may partially close only one eye (e.g., wink) longer than a normal involuntary blink, e.g., 0.5 second, 1 second, 2 second, etc. If only one eye is closed or partially closed, the closure or partial closure of the left eye may be interpreted differently than the closure or partial closure of the right eye. In various implementations, the system may recognize one or more of these various gestures to mean different commands or comprises different inputs. Any of these gesture may additionally be combine with assessment by the camera(s) of the gaze directions and/or vergence of the eye. For example, the meaning of the gesture may be different depending on where the gaze direction and/or vergence of the eye is observed by the cameras to be. In certain implementations, for example, the display presents to the user one or more buttons, menu item, or other regions associated with a particular command, instruction, selection, or input. If the user's gaze and/or vergance is directed to that button, menu item, or other regions associated with a particular command, instruction, selection, or input and an appropriate gesture such as described herein (e.g., one or more blinks, winks, squints or blink, wink, squint lasting for a sufficiently long duration of time) is performed the system will interpret such gesture as a particular command, instruction, selection, or input, e.g., associated with what is displayed in connection with said button, menu item, or other region. For example, if a button for activating a program is displayed to the user at a particular vertical and horizontal (e.g., x, y) location and/or at a particular depth (e.g., z) and the user's gaze direction and/or vergence are directed toward the location (e.g., x, y) of that button and/or converge at the distance (e.g., z) associated with the depth where that button appears to be located, and the user implements the appropriate gesture (e.g., blink), the program will be activated.

The eye gestures may serve as commands, inputs or instructions to change or initiate a display mode or other mode of the system (e.g., alter an audio parameter such as volume), control a display of virtual content (e.g., cause a video or audio recording to start). Other options are possible. A wide range of display modes such as color, contrast, brightness, etc. are possible parameters that can be controlled. These gestures may also be used as inputs to the system or software or applications (e.g., apps) ran on the system similar to the way a mouse, key on a keyboard, or touch or other motion on a touch screen may be used as inputs. Buttons, menu options, windows with selections, or other regions associated with potential inputs may be provided by the display. The display may simply request or prompt the user for a particular gesture as input (e.g., blink twice to activate game, close eyes for moment to start video, etc.).

Figure 12:
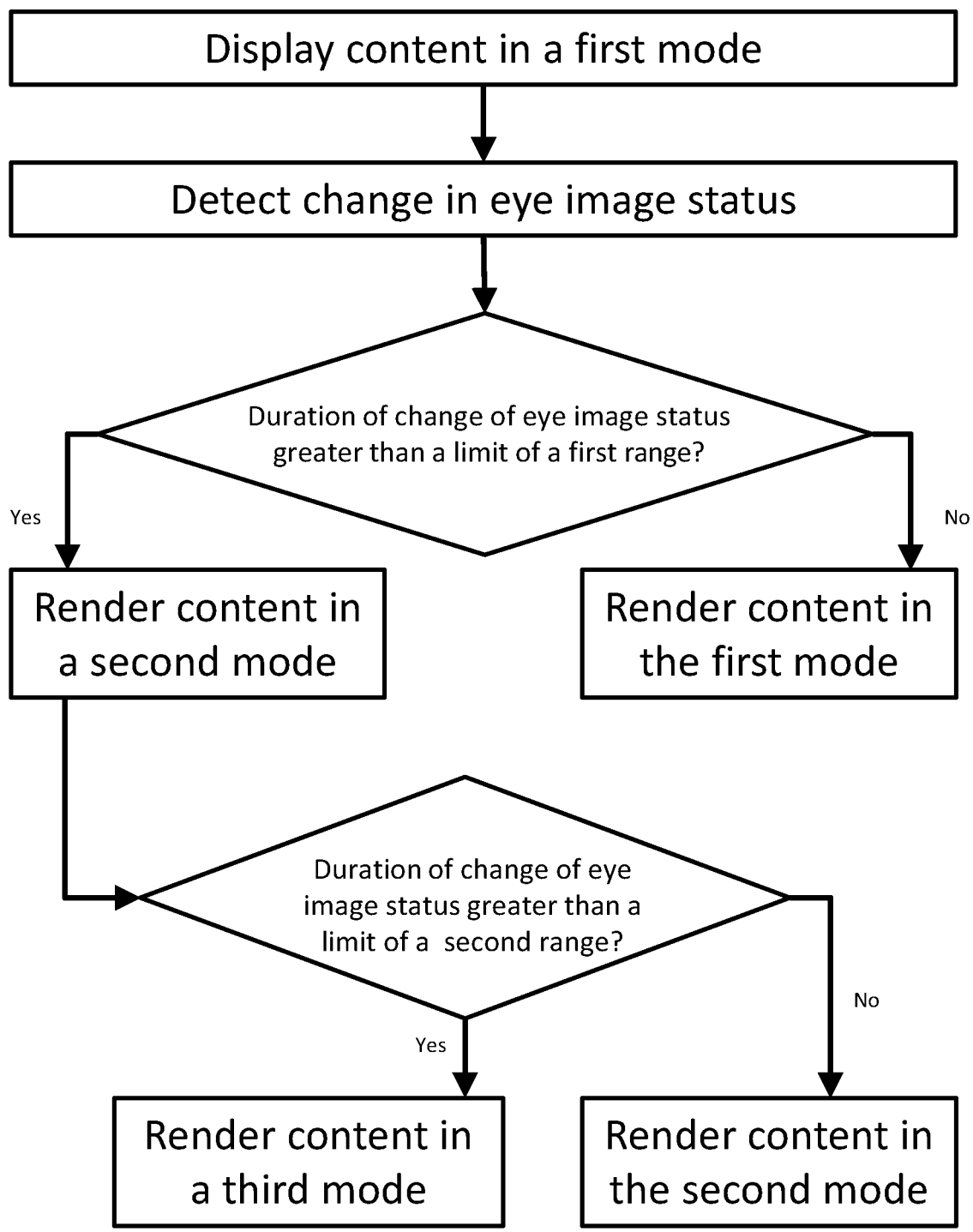
FIG. 12 illustrates a flowchart of a process for changing a virtual content mode based on a detected user eye metric according to some implementations.

FIG. 12 illustrates an example process for adjusting virtual content render modes based on input such as eye image detection or eye status detection, according to one implementation. As depicted, content is rendered and displayed in a first mode (such as having a first color or chromatic mode, or a mode that places the content in a first position). The first mode may corresponding to how image content is rendered, for example, the color or color palette that can be used, what depth to render (e.g, close up or distant), size (e.g., enlarge or reduce). Other implementations are possible. Upon and/or based on detecting eye closure or change in eye image status indicative of eye closure such as eyelid occlusion, the content mode may change. In some implementations, the change can depend on duration of the change in the eye image status.

In some implementations, a change in status is detected concurrent with a lack of detection of threshold eye image data (e.g., lack of a detected pupil, lack of a detected iris, or portions thereof, etc.) by one or more inward facing sensors. monitoring both the left and right eye. In some implementations, the threshold eye image may be of both eyes (e.g., in a blink) captured by a single camera or respective left and right cameras. Depending on frame rate and sensitivity of the inward facing sensors, the concurrent detection may impart of a limit (e.g., lower limit) of a first range of detecting eye closure to be instantaneous with any eye closure (i.e. greater than zero seconds). In some implementations, a deliberate limit to a first range of eye image status change is set to detect eye closure greater than 10 ms. Other values are possible.

Upon detecting an eye image status change greater than a threshold first limit value and/or within a first range, the graphics rendering module prepares content according to a second mode. In some implementations, the second mode is a change of at least one color aspect of the virtual content. For example, the display may present virtual content using a first pallet of color during a first mode, and may use a second pallet of color comprises displaying a second color for the virtual object in the second mode. The display of the virtual content using the first pallet of color can include displaying a first color for a virtual object. Additionally or alternatively, the display of the virtual content using the second palette of color can include displaying a second color for the virtual object. The first and second colors may be different and/or may be from a different color palette.

Color or color palette is only one example of a render mode. Other render modes or modes of operation of the display system are possible. For example, the render mode could be where virtual content is to be located and/or how the virtual content moves or different effects imposed on the virtual content. In some implementations, for example, in the first mode the display presents virtual content at a first location on the display and in the second mode presents the virtual content at a second location on the display. In some implementations, in the second mode the processing electronics may cause the virtual content to appear to move along the display in a predictable path. For example, the virtual content or object (e.g., zombies, monsters) may appear to move toward the user in the second mode. Still other modes are possible.

In some implementations, eye status changes that persist so as to pass a limit of a second range, may trigger the graphics rendering module to prepare content for display in a third mode. In some implementations, the third mode is, for example, a change to display location of the virtual content. Display location of a first or second mode may be stationary or follow a preset path of motion. Display location of a third mode may be to initiate movement towards a preset target (such as the wearable display device itself) or to follow a new path of motion (such as orbiting the wearable display device). Other modes are possible.

Likewise, objects may appear to move toward or away from the user as well as to the side of the user and/or behind or around the user. Such positioning of the virtual content or objects may be implemented by displaying the object at different locations. Additionally or in the alternative, audio may be used to provide indication of position and/or movement of an object. For example if an sound associated with an object appears on a speaker for the user's left ear, the object may appear to be located to the left. Similarly, if an sound associated with an object appears on a speaker for the user's right ear, the object may appear to be located to the left. Shifting more of the sound from the left to the right may make the object appear to be moving toward the right while shifting more of the sound from the right to the left may make the object appear to be moving toward the right. Such perceptions of location and movement may be created even if the user's eyes are closed. Gestures or eye status may be used to trigger such positioning, repositioning or movement of virtual object or content.

In some implementations, if the eye image status exceeds both the limit of the first and second limits or ranges, the graphics rendering module will prepare virtual content in both the second and third modes. That is, according to some implementations, the third mode will render virtual content with both color change and position or path of motion. Other modes or combinations of modes are possible.

In various implementations, the mode governs how the image content or virtual content is perceived by the users. In some implementations, however, the mode governs different properties or parameters of the display system such as the audio. For example, the mode may correspond to the volume of audio output of the display system. Additionally, as discussed above, which speaker (e.g., left ear or right ear speakers) that particular sound emanated from may contribute to the user's perception of where a virtual object or virtual content is located. Accordingly, in various implementations, the mode may alter which speaker (e.g., left ear or right ear speakers) sound is output. In some cases sound is output from both but the mode may change the balance, the amount of source from each (possibly shifting the distribution of sound such that more sound emanated from one speaker and less sound emanates from the other speaker. The changes may be specific to particular sounds. For example, one or more sounds created by the speakers may change while other sounds created by the speaker need not change with a change of mode.

In other implementations, the eye gesture may alternatively determine a category of content to be displayed. A category may include, for example, a type of object for display, an animation type, video or movie, or a audio recording or some other category. Likewise the eye gesture may cause particular virtual content to be displayed or not displayed. For example, the eye gesture may cause a particular item (e.g., document, spreadsheet, image, file, folder, window etc.) to open.

In various implementations described herein, the particular eye gesture, cues or detected status of the eye does not necessarily cause the device system to alter to reduce power consumed. In some implementations, for example, the particular eye gesture, cues, or detected status of the eye does not cause the display system to enter a power savings move. In some implementations, for example, the eye gesture, cues or detected status of the eye does not cause the display system to change modes or provides or not provide image content or virtual content that reduces the power consumption of the display device.

Figure 13:
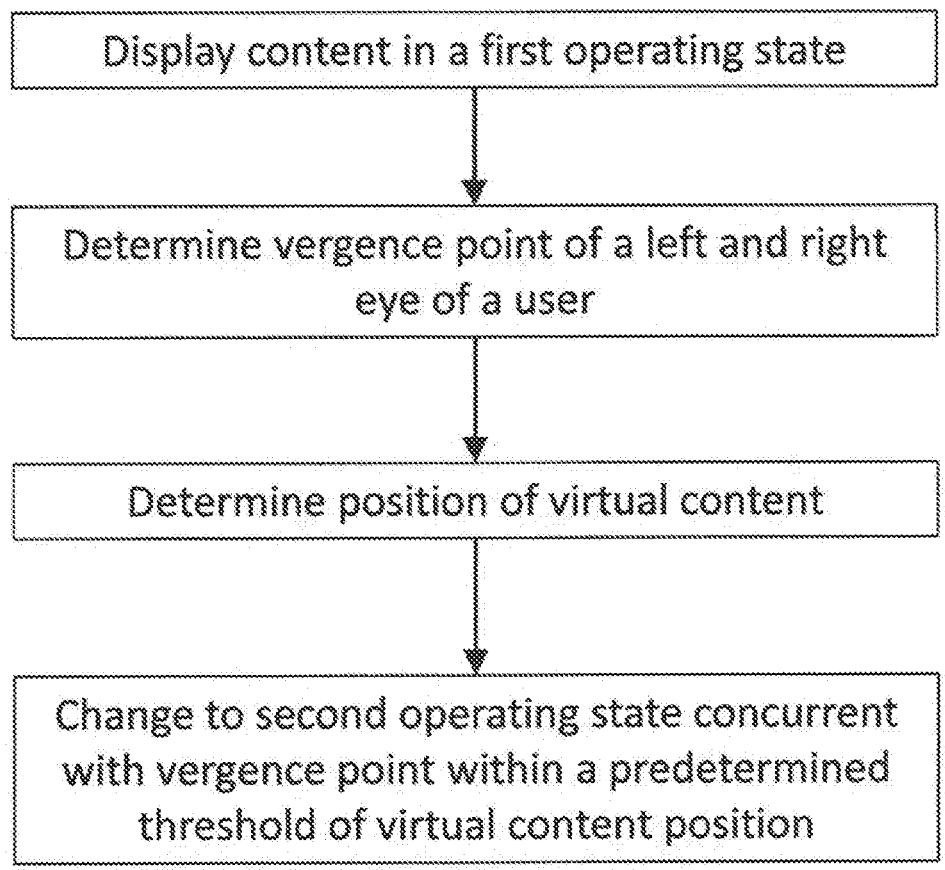
FIG. 13 illustrates a flowchart of a process for changing an operating state based on a detected vergence point according to some implementations.

Other gestures, cues, or indications of eye status can be employed to provide input to the display system. FIG. 13, for example, illustrates an example process for adjusting virtual content operating states based on input such as eye gaze direction and/or vergence. As depicted, content is rendered and displayed in a first operating state (such as static mode), which may govern the image content presented and/or how the image content is rendered. Upon detecting the gaze directions of the respective eyes converging within a volume or area of the content (e.g., distance to the content or sufficiently close in depth to the content), its operating state may change to a second operating state which may govern the image content presented and/or how the image content is rendered. This second operation state may for example comprise a dynamic mode or selection mode enabling subsequent input commands to further interact with the content. For example, in a first operating state, the content may be a static painting, but when the user's eyes converge on the painting a short movie will begin to play, or ancillary interfaces will present itself to further interaction such as a volume controller or metadata like creator credit information, or the content will be enabled such that additional commands such as "play movie" will be received whereas in the first operating state additional inputs would have no impact upon the content.

Using the inward-facing camera(s), the display system can detect a first amount of vergence and/or a first focal point or depth of the user's eyes. Based on the detected first vergence, focal point and/or depth, the system can present first virtual content on the display. A second vergence, focal point, and/or depth can be detected by the system, which may then provide a second virtual content in addition to or in place of the first virtual content depending on the implementation. In one example, the first and second virtual content are different objects (e.g., a person versus a monster). In another example, both the virtual content as well as the type of virtual may change. The first virtual content may, for example, represent static virtual content (e.g., an image of a waterfall) while the second virtual content represents animated virtual content (e.g., video of a waterfall). Other implementations are possible.

Recognition of the change in vergence as a cue, command, instruction or selection may depend on the how long the system detects the particular change in vergence or that the user's eyes are focused at a particular focal point and/or depth. For example, display of particular content and/or display in a particular way in which content is presented may only be trigger if a new vergence is detected and that the eyes remain at that vergence for at least a particular duration, e.g., 1, 2, 3, 5 s or more seconds, or any range between any of these values.

Figure 14:
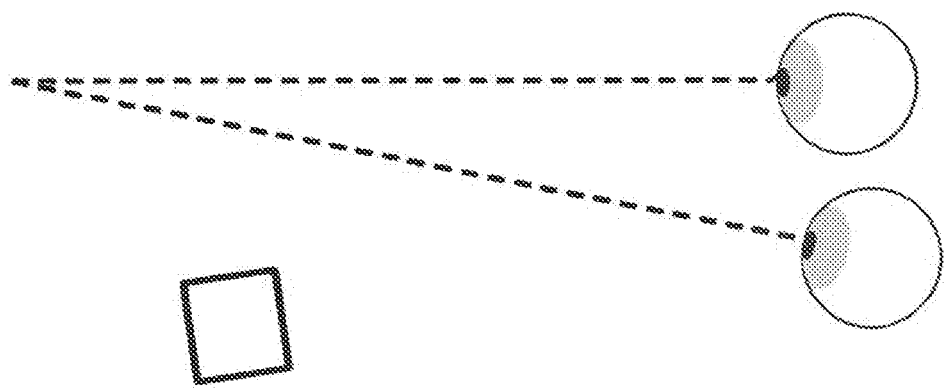
FIG. 14 illustrates a content operating state as a function of eye vergence according to some implementations.
Figure 14:
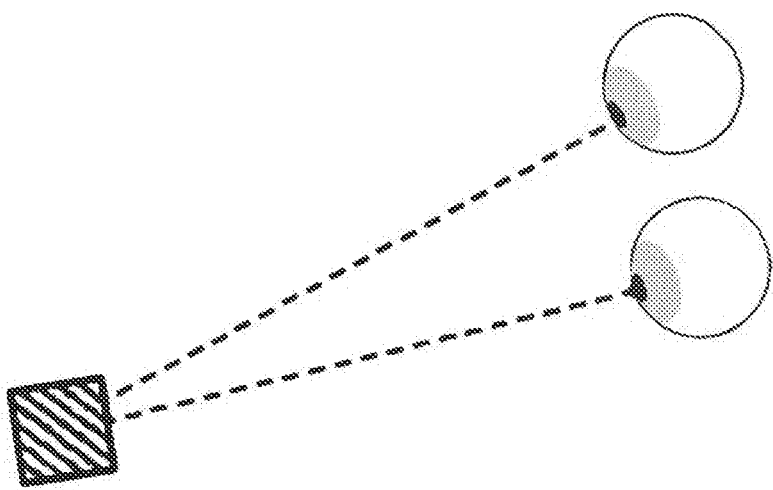

FIG. 14 is a visual representation of when eyes have vergence on virtual content (indicated by the striped lines) the second operating state is enabled, whereas when the eyes have a vergence point away from the object, it enters a static/nonresponsive first operating state.

Accordingly, eye tracking and in particular vergence may be used as an input for the display system to determine what image content to displayed. The display system may be configured to capture eye movement, eye orientation, vergence, focus location and/or depth, as a command, instruction, selection or input for what image content to present and/or what mode to render image content.

In some implementations, the display system may be configured to capture eye movement, eye orientation, vergence, focus location and/or depth, in combination with other eye gestures described herein as a command, instruction, or input. For example, the display device may determine a combination of a particular vergence or depth where the eyes are directed as well as a particular gesture, for example, the partial or full closure of one or both eyes (e.g., a blink, wink, or squint) as a command, instruction or input. A wide variety of options are available. The gesture, cue, or detected eye status may, for example, comprising a combination of at least two of the partially or fully closing of one of said eyes, gaze direction, movement in gaze of one of said eyes, vergence, or change in vergence. For example, the gesture may comprise a combination of at least partially or fully closing one of said eyes and movement in gaze of one of said eyes. In some implementations, the gesture may comprise a combination of at least partially or fully closing one of said eyes and change in vergence. In some implementations, the gesture may comprise a combination of at least movement in gaze of one of said eyes and change in vergence. In certain implementations, the gesture may comprise a combination of at least partially or fully closing one of said eyes, movement in gaze of one of said eyes and change in vergence. Still other possible combinations are possible.

In some implementations, the command, instruction or input may be contingent upon the partial or full closure of the one or both eyes (blink, wink, squint) lasting for a threshold duration. In some implementations, the command, instruction or input may be contingent upon multiple the partial or full closures of the one or both eyes (blink, wink, squint) possibly wherein the time between such closures is short compared to an involuntary blink (e.g., is less than 3 sec, 2 sec, 1 sec, 0.5 sec, or any range between any of these values).

In some implementations, images such as buttons, menu items, or other regions associated with selections are presented to the user and if the user directs their gaze toward such items while performing the eye gesture, the display system interprets such action as an instruction, command, input, or selection. Similarly, in some implementations, images such as buttons, menu items, or other regions associated with selections are presented to the user at a particular apparent depth, and if the user's vergence is directed at the depth of such items while performing the eye gesture, the display system interprets such action as an instruction, command, input, or selection. In some implementations, images such as buttons, menu items, or other regions associated with selections are presented to the user at a particular apparent depth and vertical and/or horizontal (e.g., x-y) position, and if the user's vergence is directed at that the depth as well as vertical and/or horizontal (e.g., x-y) position lateral of such items while performing the eye gesture, the display system interprets such action as an instruction, command, input, or selection. In some implementations, virtual content items need not be placed at the particular location of the user's vergence, nevertheless, particular user vergence coupled with particular gestures (possibly with gaze directed at a particular horizontal and/or vertical position or region) may be interpreted as a command, instruction, or input.

Accordingly, as described herein, processing electronics (e.g., the controller 606) can create or modify image content based on the captured eye movement, gaze and/or vergence determination. In some implementations, eye tracking can be performed by the eye camera(s) to determine eye gaze (e.g., direction or orientation of one or both eyes). Gaze direction of the eyes may be used to determine vergence. In various implementations, vergence of the eyes may be determined using triangulation. Various techniques for determining eye gaze and vergence are discussed in PCT Application No. PCT/US2019/014052 filed on Jan. 17, 2019, published as WO 2019/143844 and titled "EYE CENTER OF ROTATION DETERMINATION, DEPTH PLANE SELECTION, AND RENDER CAMERA POSITIONING IN DISPLAY SYSTEMS" which is incorporated herein by reference in its entirety as well as in U.S. patent application Ser. No. 16/250,931, filed on Jan. 17, 2019, published as U.S. Patent Publication No. US-2019/0243448 and titled "EYE CENTER OF ROTATION DETERMINATION, DEPTH PLANE SELECTION, AND RENDER CAMERA POSITIONING IN DISPLAY SYSTEMS" which is also incorporated herein by reference in its entirety. Other techniques may also be employed.

The augmented, mixed, or virtual reality display systems described herein may be configured to receive input (e.g., visual input from an inward-facing or outward-facing camera of the user's wearable system or sensory input from various sensors, user-input devices or totem, eye tracking cameras, etc.) from one or more user wearable systems (e.g., the wearable system 200). The wearable systems can use various sensors (e.g., inertial measurement units, accelerometers, gyroscopes, movement sensors, depth sensors, GPS sensors, inward-facing imaging system, outward-facing imaging system, etc.) to determine the location and various other attributes of the environment of the user or attributes of the user (e.g., eye vergence, eye pose, eye blinks, head pose, hand or body gestures, etc.). In various implementations, the image data acquired by the cameras (such as the inward-facing or the outward-facing imaging systems) may be reduced to a set of mapping points or key points or computer vision features.

One or more object recognizers (e.g., executed by the local processing and data module 224 or the remote processing module 228) can crawl through the received data (e.g., the collection of points or features) and recognize or map points, tag images, attach semantic information to objects, optionally with the help of a map database of the environment of the user. The map database may comprise various points collected over time and their corresponding objects in the environment (including points collected of the user himself or herself such as periocular features of the user). The various devices, sensors, and wearable components and the map database can be connected to each other through a network (e.g., LAN, WAN, etc.) to access the cloud.

Based on this information and collection of points in the map database and acquired by the imaging systems and sensors, the object recognizers may recognize objects in an environment or features associated with the user. For example, the object recognizers can recognize faces, persons, windows, walls, user input devices, televisions, documents, other objects in the user's environment, etc. As another example, the object recognizers can recognize the user's eyes or eye features (e.g., pupil, iris, or cornea). One or more object recognizers may be specialized for object with certain characteristics. For example, an object recognizer may be used to recognizer faces, while another object recognizer may be used to recognize hand gestures, while yet another object recognizer may be used to recognize eye blinks, eye motions, and so forth. The recognized objects (e.g., eye features) can be used to generate eye pose, determine eye vergence, or for eye tracking.

The object recognitions may be performed using a variety of computer vision techniques. For example, the wearable system can analyze the images acquired by the outward-facing imaging system or the inward-facing imaging system to perform scene reconstruction, event detection, video tracking, object recognition (e.g., persons or documents), object pose estimation, facial recognition or feature recognition (e.g., from a person in the environment or the user), learning, indexing, motion estimation, or image analysis (e.g., identifying eye blinks, eye movements, eye pose, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, parallel tracking and mapping (PTAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the wearable system (e.g., in the local processing and data module 224 or the remote data repository 240). Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or a deep neural network), dimensionality reduction algorithms (such as, for example, Principal Component Analysis), ensemble algorithms (such as, for example, Stacked Generalization), or other machine learning algorithms. Individual models can be customized for individual data sets. For example, the wearable device can generate or store a base model. The base model may be used as a starting point to generate additional models specific to a data type (e.g., specific features of a particular user such as, e.g., the user's eyes), a data set (e.g., a set of additional images obtained of the user by the inward-facing imaging system), conditional situations, or other variations. The wearable display system can be configured to utilize a plurality of techniques to generate models for analysis of the aggregated data. Other techniques may include using pre-defined thresholds or data values. Accordingly, the base model can be updated to generate a model personalized for a particular user of the wearable display system.

The systems, methods and devices of this disclosure each have several innovative aspects, no single one of which is solely responsible for the desirable attributes disclosed herein. A variety of example systems and methods are provided below.

Example 1: A head mounted display system for displaying image content to a user, the display system comprising:
  at least one display configured to be worn by a user to present virtual content to first and second eyes of a user;
  a first inward facing camera configured to image the first eye of the user;
  a second inward facing camera configured to image the second eye of the user; and
  processing electronics in communication with the first and second inward-facing cameras and said at least one display, the processing electronics configured to:
    present virtual content to the user on said at least one display;
    using the first inward-facing camera, determine that the first eye is at least partially closed;
    using the second inward-facing camera, determine that the second eye is at least partially closed; and
    based on the determination that the first and second eyes of the user are at least partially closed, alter a state of the head mounted display system so as to modify the virtual content presented to the user, the manner in which virtual content is presented to the user, a performance feature of the head mounted display system apparent to the user, or any combination thereof.

Example 2: The display system of Example 1, wherein the processing electronics are configured to alter said state of the head mounted display system based on a determination that the first and second eyes of the user are at least partially closed for longer than the threshold time.

Example 3: The display system of Example 2, wherein said threshold time is in the range from 500 milliseconds to 1.5 second.

Example 4: The display system of Example 2, wherein said threshold time in the range from 750 milliseconds to 2.0 seconds.

Example 5: The display system of Example 2, wherein said threshold time in the range from 1 second and 3 seconds.

Example 6: The display system of Example 2, wherein said threshold time in the range from 3 second and 10 seconds.

Example 7: The display system of Example 1, wherein the processing electronics are configured to alter said state of the head mounted display system based on a determination that the first and second eyes of the user transition from being in an opened state to being in an at least partially closed state at least a first time and a second time.

Example 8: The display system of Example 7, wherein said first and second times are separated by less than 3 seconds.

Example 9: The display system of Example 7, wherein said first and second times are separated by less than 2 seconds.

Example 10: The display system of Example 7, wherein said first and second times are separated by less than 1.5 seconds.

Example 11: The display system of Example 1, wherein the processing electronics are configured to alter said state of the head mounted display system based on a determination that the first and second eyes of the user transition from being in an opened state to being in an at least partially closed state at least three times, a first time, a second time, and a third time.

Example 12: The display system of Example 11, wherein said first and second times as well as said second and third times are separated by less than 3 seconds.

Example 13: The display system of Example 11, wherein said first and second times as well as said second and third times are separated by less than 2 seconds.

Example 14: The display system of Example 11, wherein said first and second times as well as said second and third times are separated by less than 1.5 seconds.

Example 15: The display system of any of the Examples above, wherein said processing electronics are configured to determine a gaze direction of said first and second eyes and use both said gaze direction and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 16: The display system of any of the Examples above, wherein said processing electronics are configured to determine a vergence of said first and second eyes and use both said vergence and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 17: The display system of any of the Examples above, wherein said processing electronics are configured to determine a gaze direction and a vergence of said first and second eyes and use said gaze direction, said vergence, and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 18: The display system of any of the Examples above, wherein said processing electronics are configured to display buttons, knobs, windows, menu items, or other regions toward which the user can direct their gaze to make a selection, said processing electronics being configured to identify said gaze direction of said first and second eyes and to use said gaze direction directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 19: The display system of any of the Examples above, wherein said processing electronics are configured to display buttons, knobs, windows, menu items, or other regions toward which the user can direct their gaze to make a selection, said processing electronics being configured to identify said gaze direction and the vergence of said first and second eyes and to use said gaze direction and vergence directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 20: The display system of any of the Examples above, wherein said processing electronics are configured to display buttons, knobs, windows, menu items, or other regions toward which the user can direct their gaze to make a selection, said processing electronics being configured to identify said the vergence of said first and second eyes and to use said vergence directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 21: The display system of any of the Examples above, wherein said processing electronics are configured to use glints on said first and second eyes to determine whether said first and second eyes are at least partially closed.

Example 22: The display system of any of the Examples above, wherein based on the determinations that the first and second eyes of the user are at least partially closed, the processing electronics are configured to alter a state of the head mounted display system so as to modify the virtual content presented to the user.

Example 23: The display system of any of the Examples above, wherein based on the determinations that the first and second eyes of the user are at least partially closed, the processing electronics are configured to alter a state of the head mounted display system so as to modify the manner in which virtual content is presented to the user.

Example 24: The display system of Example 23, wherein the manner in which virtual content is presented to the user includes the color of virtual content, the color palette used to provide color to virtual content, the position of virtual content, or movement of virtual content.

Example 25: The display system of any of the Examples above, wherein based on the determinations that the first and second eyes of the user are at least partially closed, the processing electronics are configured to alter a state of the head mounted display system so as to modify a performance feature of the head mounted display system apparent to the user.

Example 26: The display system of Example 25, wherein a performance feature of the head mounted display system apparent to the user includes audio characteristics.

Example 27: The display system of Example 26, wherein said audio characteristics include volume, which speaker a particular sound emanates from, balance between speakers, or any combination thereof.

Example 28: The display system of any of Examples above, wherein said determination that causes said state to be altered is that said first and second eyes are partially closed.

Example 29: The display system of any of Examples above, wherein said determination that causes said state to be altered is that said first and second eyes are squinting.

Example 30: The display system of any of Examples above, wherein said determination that causes said state to be altered is that said first and second eyes are fully closed.

Example 31: The display system of any of Examples above, wherein said determination that causes said state to be altered is that said first and second eyes are blinking.

Example 32: The display system of any of the Examples above, said altering of said state of the head mounted display does not reduce power consumption of said head mounted display system.

Example 33: A head mounted display system for displaying image content to a user, the display system comprising:
  at least one display configured to be worn by a user to present virtual content to first and second eyes of a user;
  a first inward facing sensor configured to monitor a first eye of the user;
  a second inward facing sensor configured to monitor a second eye of the user; and
  processing electronics in communication with the first and second inward-facing cameras and said at least one display, the processing electronics configured to:
    present virtual content to the user on said at least one display;
    using the first inward-facing camera, determine that the first eye is at least partially closed;
    using the second inward-facing camera, determine that the second eye is at least partially closed; and
    based on the determination that the first and second eyes of the user are at least partially closed, alter a state of the head mounted display system so as to modify the virtual content presented to the user, the manner in which virtual content is presented to the user, a performance feature of the head mounted display system apparent to the user, or any combination thereof, wherein said altering of said state of the head mounted display does not reduce power consumption of said head mounted display system.

Example 34: The display system of Example 33, wherein the processing electronics are configured to alter said state of the head mounted display system based on a determination that the first and second eyes of the user are at least partially closed for longer than the threshold time.

Example 35: The display system of Example 36, wherein said threshold time is in the range from 500 milliseconds to 1.5 second.

Example 36: The display system of Example 36, wherein said threshold time in the range from 750 milliseconds to 2.0 seconds.

Example 37: The display system of Example 36, wherein said threshold time in the range from 1 second and 3 seconds.

Example 38: The display system of Example 36, wherein said threshold time in the range from 3 second and 10 seconds.

Example 39: The display system of Example 33, wherein the processing electronics are configured to alter said state of the head mounted display system based on a determination that the first and second eyes of the user transition from being in an opened state to being in an at least partially closed state at least a first time and a second time.

Example 40: The display system of Example 39, wherein said first and second times are separated by less than 3 seconds.

Example 41: The display system of Example 39, wherein said first and second times are separated by less than 2 seconds.

Example 42: The display system of Example 39, wherein said first and second times are separated by less than 1.5 seconds.

Example 43: The display system of Example 33, wherein the processing electronics are configured to alter said state of the head mounted display system based on a determination that the first and second eyes of the user transition from being in an opened state to being in an at least partially closed state at least three times, a first time, a second time, and a third time.

Example 44: The display system of Example 43, wherein said first and second times as well as said second and third times are separated by less than 3 seconds.

Example 45: The display system of Example 43, wherein said first and second times as well as said second and third times are separated by less than 2 seconds.

Example 46: The display system of Example 43, wherein said first and second times as well as said second and third times are separated by less than 1.5 seconds.

Example 47: The display system of any of the Examples above, wherein said processing electronics are configured to determine a gaze direction of said first and second eyes and use both said gaze direction and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 48: The display system of any of the Examples above, wherein said processing electronics are configured to determine a vergence of said first and second eyes and use both said vergence and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 49: The display system of any of the Examples above, wherein said processing electronics are configured to determine a gaze direction and a vergence of said first and second eyes and use said gaze direction, said vergence, and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 50: The display system of any of the Examples above, wherein said processing electronics are configured to display buttons, knobs, windows, menu items, or other regions toward which the user can direct their gaze to make a selection, said processing electronics being configured to identify said gaze direction of said first and second eyes and to use said gaze direction directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 51: The display system of any of the Examples above, wherein said processing electronics are configured to display buttons, knobs, windows, menu items, or other regions toward which the user can direct their gaze to make a selection, said processing electronics being configured to identify said gaze direction and the vergence of said first and second eyes and to use said gaze direction and vergence directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 52: The display system of any of the Examples above, wherein said processing electronics are configured to display buttons, knobs, windows, menu items, or other regions toward which the user can direct their gaze to make a selection, said processing electronics being configured to identify said the vergence of said first and second eyes and to use said vergence directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 53: The display system of any of the Examples above, wherein said processing electronics are configured to use glints on said first and second eyes to deteremine whether said first and second eyes are at least partially closed.

Example 54: The display system of any of the the Examples above, wherein based on the determinations that the first and second eyes of the user are at least partially closed, the processing electronics are configured to alter a state of the head mounted display system so as to modify the virtual content presented to the user.

Example 55: The display system of any of the Examples above, wherein based on the determinations that the first and second eyes of the user are at least partially closed, the processing electronics are configured to alter a state of the head mounted display system so as to modify the manner in which virtual content is presented to the user.

Example 56: The display system of Example 55, wherein the manner in which virtual content is presented to the user includes the color of virtual content, the color palette used to provide color to virtual content, the position of virtual content, or movement of virtual content.

Example 57: The display system of any of the Examples above, wherein based on the determinations that the first and second eyes of the user are at least partially closed, the processing electronics are configured to alter a state of the head mounted display system so as to modify a performance feature of the head mounted display system apparent to the user.

Example 58: The display system of Example 57, wherein a performance feature of the head mounted display system apparent to the user includes audio characteristics.

Example 59: The display system of Example 58, wherein said audio characteristics include volume, which speaker a particular sound emanates from, balance between speakers, or any combination thereof.

Example 60: The display system of any of the Examples above, wherein said determination that causes said state to be altered is that said first and second eyes are partially closed.

Example 61: The display system of any of the Examples above, wherein said determination that causes said state to be altered is that said first and second eyes squinting.

Example 62: The display system of any of the Examples above, wherein said determination that causes said state to be altered is that said first and second eyes are fully closed.

Example 63: The display system of any of the Examples above, wherein said said determination that causes said state to be altered is that said first and second eyes are blinking.

Example 64: The display system of any of the Examples above, wherein said first and second sensors comprise optical detectors.

Example 65: The display system of any of the Examples above, wherein said first and second sensors comprise cameras.

Example 66: The display system of any of the Examples above, said altering of said state of the head mounted display does not reduce power consumption of said head mounted display system.

Example 67: A head mounted display system for displaying image content to a user, the display system comprising:
- at least one display configured to be worn by a user to present virtual content to first and second eyes of a user;
- a first inward facing camera configured to image the first eye of the user;
- a second inward facing camera configured to image the second eye of the user; and
- processing electronics in communication with the first and second inward-facing cameras and said at least one display, the processing electronics configured to:
  - present virtual content to the user on said at least one display;
  - using the first and second inward-facing cameras determine a gaze direction of said first and second eyes; and
  - based on a determination of said gaze direction, alter a state of the head mounted display system so as to modify the manner in which virtual content is presented to the user, a performance feature of the head mounted display system apparent to the user, or any combination thereof.

Example 68: The display system of any of the Examples above, wherein said processing electronics are configured to determine a vergence and based on said determination of said gaze direction and said vergence, alter said state state of the head mounted display system so as to modify the virtual content presented to the user, the manner in which virtual content is presented to the user, a performance feature of the head mounted display system apparent to the user, or any combination thereof.

Example 69: The display system of any of the Examples above, wherein said processing electronics are configured to use both said gaze direction and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 70: The display system of any of the Examples above, wherein said processing electronics are configured to determine a vergence of said first and second eyes and that the first and second eyes of the user are at least partially closed and use said gaze direction, said vergence, and a determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 71: The display system of any of the Examples above, wherein said processing electronics are configured to display buttons, knobs, windows, menu items, or other regions toward which the user can direct their gaze to make a selection, said processing electronics to use said gaze direction directed at said buttons, knobs, windows, menu items, or other regions in identifying a command or selection to alter said state of the head mounted display system so as to modify the virtual content presented to the user, the manner in which virtual content is presented to the user, a performance feature of the head mounted display system apparent to the user, or any combination thereof.

Example 72: The display system of any of the Examples above, wherein said processing electronics are configured to display buttons, knobs, windows, menu items, or other regions toward which the user can direct their gaze to make a selection, said processing electronics further being configured to identify the vergence of said first and second eyes and to use said gaze direction and vergence directed at said buttons, knobs, windows, menu items, or other regions in identifying a command or selection to alter said state of the head mounted display system so as to modify the virtual content presented to the user, the manner in which virtual content is presented to the user, a performance feature of the head mounted display system apparent to the user, or any combination thereof.

Example 73: The display system of any of the Examples above, wherein based on the determined gaze direction, the processing electronics are configured to alter a state of the head mounted display system so as to modify the manner in which virtual content is presented to the user.

Example 74: The display system of Example 73, wherein the manner in which virtual content is presented to the user includes the color of virtual content, the color palette used to provide color to virtual content, the position of virtual content, or movement of virtual content.

Example 75: The display system of any of the Examples above, wherein based on the determined gaze direction, the processing electronics are configured to alter a state of the head mounted display system so as to modify a performance feature of the head mounted display system apparent to the user.

Example 76: The display system of Example 75, wherein a performance feature of the head mounted display system apparent to the user includes audio characteristics.

Example 77: The display system of Example 76, wherein said audio characteristics include volume, which speaker a particular sound emanates from, balance between speakers, or any combination thereof.

Example 78: The display system of any of the Examples above, said altering of said state of the head mounted display does not reduce power consumption of said head mounted display system.

Example 79: A head mounted display system for displaying image content to a user, the display system comprising:
 at least one display configured to be worn by a user to present virtual content to first and second eyes of a user;
 a first inward facing camera configured to image the first eye of the user;
 a second inward facing camera configured to image the second eye of the user; and
 processing electronics in communication with the first and second inward-facing cameras and said at least one display, the processing electronics configured to:
  present virtual content to the user on said at least one display;
  using the first and second inward-facing cameras determine a vergance of said first and second eyes; and
  based on a determination of said vergence, alter a state of the head mounted display system so as to modify the virtual content presented to the user, the manner in which virtual content is presented to the user, a performance feature of the head mounted display system apparent to the user, or any combination thereof.

Example 80: The display system of any of the Examples above, wherein said processing electronics are configured to determine a gaze direction of said eyes and based on said determination of said gaze direction and said vergence, alter said state state of the head mounted display system so as to modify the virtual content presented to the user, the manner in which virtual content is presented to the user, a performance feature of the head mounted display system apparent to the user, or any combination thereof.

Example 81: The display system of any of the Examples above, wherein said processing electronics are configured to use both said vergence and a determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 82: The display system of any of the Examples above, wherein said processing electronics are configured to determine a gaze direction of said first and second eyes and that the first and second eyes of the user are at least partially closed and use said gaze direction, said vergence, and a determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 83: The display system of any of the Examples above, wherein said processing electronics are configured to display buttons, knobs, windows, menu items, or other regions toward at an apparent distance from the user, and said processing electronics are configured to detect a vergence corresponding to said apparent distance of said buttons, knobs, windows, menu items, or other regions in identifying a command or selection to alter said state of the head mounted display system so as to modify the virtual content presented to the user, the manner in which virtual content is presented to the user, a performance feature of the head mounted display system apparent to the user, or any combination thereof.

Example 84: The display system of any of the Examples above, wherein said processing electronics are configured to display buttons, knobs, windows, menu items, or other regions toward which the user can direct their gaze to make a selection, said processing electronics further being configured to identify the vergence of said first and second eyes and to use said gaze direction and vergence directed at said buttons, knobs, windows, menu items, or other regions in identifying a command or selection to alter said state of the head mounted display system so as to modify the virtual content presented to the user, the manner in which virtual content is presented to the user, a performance feature of the head mounted display system apparent to the user, or any combination thereof.

Example 85: The display system of any of the Examples above, wherein based on the determined vergence, the processing electronics are configured to alter a state of the head mounted display system so as to modify the virtual content presented to the user.

Example 86: The display system of any of the Examples above, wherein based on the on determined vergence, the processing electronics are configured to alter a state of the head mounted display system so as to modify the manner in which virtual content is presented to the user.

Example 87: The display system of Example 86, wherein the manner in which virtual content is presented to the user includes the color of virtual content, the color palette used to provide color to virtual content, the position of virtual content, or movement of virtual content.

Example 88: The display system of any of the Examples above, wherein based on the determined vergence, the processing electronics are configured to alter a state of the head mounted display system so as to modify a performance feature of the head mounted display system apparent to the user.

Example 89: The display system of Example 88, wherein a performance feature of the head mounted display system apparent to the user includes audio characteristics.

Example 90: The display system of Example 89, wherein said audio characteristics include volume, which speaker a particular sound emanates from, balance between speakers, or any combination thereof.

Example 91: The display system of any of the Examples above, said altering of said state of the head mounted display does not reduce power consumption of said head mounted display system.

Example 92: A head mounted display system for displaying image content to a user, the display system comprising:
 at least one display configured to be worn by a user to present virtual content to first and second eyes of a user;
 at least one inward-facing sensor configured to monitor said first and second eyes of the user; and processing electronics in communication with the at least one inward-facing sensor and said at least one display, the processing electronics configured to:
  present virtual content to the user on said at least one display;
  using the at least one inward-facing sensor, determine that the first eye is at least partially closed and that the second eye is at least partially closed; and
  based on the determinations that the first and second eyes of the user are at least partially closed for a threshold duration, alter a state of the head mounted display system so as to modify the virtual content presented to the user, the manner in which virtual content is presented to the user, a performance feature of the head mounted display system apparent to the user, or any combination thereof.

Example 93: The display system of Example 92, wherein said threshold duration is in a range from 500 milliseconds to 1 second.

Example 94: The display system of Example 92, wherein said threshold duration is in a range from 750 milliseconds and 1.5 seconds.

Example 95: The display system of Example 92, wherein said threshold duration is in a range from 1 second and 3 seconds.

Example 96: The display system of Example 92, wherein said threshold duration is in a range from 3 seconds and 5 seconds.

Example 97: The display system of any of the Examples above, wherein said determination is that said first and second eyes are partially closed for at least said threshold duration.

Example 98: The display system of any of the Examples above, wherein said determination is that said first and second eyes are squinting for at least said threshold duration.

Example 99: The display system of any of the Examples above, wherein said determination is that said first and second eyes are fully closed for at least said threshold duration.

Example 100: The display system of any of the Examples above, wherein said determination is that said first and second eyes are blinking for at least said threshold duration.

Example 101: The display system of any of the Examples above, wherein said at least one inward facing sensor comprises at least one optical detector.

Example 102: The display system of any of the Examples above, wherein said at least one inward facing sensor comprises at least one camera.

Example 103: The display system of any of the Examples above, wherein said at least one inward facing sensor comprises a first inward facing sensor configured to monitor the first eye and a second inward facing sensor configured to monitor the second eye.

Example 104: The display system of Example 103, wherein first and second inward facing sensors comprise first and second inward facing cameras.

Example 105: The display system of any of the Examples above, wherein said processing electronics are configured to determine a gaze direction of said first and second eyes and use both said gaze direction and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 106: The display system of any of the Examples above, wherein said processing electronics are configured to determine a vergence of said first and second eyes and use both said vergence and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 107: The display system of any of the Examples above, wherein said processing electronics are configured to determine a gaze direction and a vergence of said first and second eyes and use said gaze direction, said vergence, and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 108: The display system of any of the Examples above, wherein said processing electronics are configured to display buttons, knobs, windows, menu items, or other regions toward which the user can direct their gaze to make a selection, said processing electronics being configured to identify said gaze direction of said first and second eyes and to use said gaze direction directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 109: The display system of any of the Examples above, wherein said processing electronics are configured to display buttons, knobs, windows, menu items, or other regions toward which the user can direct their gaze to make a selection, said processing electronics being configured to identify said gaze direction and the vergence of said first and second eyes and to use said gaze direction and vergence directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 110: The display system of any of the Examples above, wherein said processing electronics are configured to display buttons, knobs, windows, menu items, or other regions toward which the user can direct their gaze to make a selection, said processing electronics being configured to identify said the vergence of said first and second eyes and to use said vergence directed at said buttons, knobs, windows, menu items, or other regions and said determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 111: The display system of any of the Examples above, wherein said processing electronics are configured to use glints on said first and second eyes to deteremine whether said first and second eyes are at least partially closed.

Example 112: The display system of any of the Examples above, wherein based on the determinations that the first and second eyes of the user are at least partially closed, the processing electronics are configured to alter a state of the head mounted display system so as to modify the virtual content presented to the user.

Example 113: The display system of any of the Examples above, wherein based on the determinations that the first and second eyes of the user are at least partially closed, the processing electronics are configured to alter a state of the head mounted display system so as to modify the manner in which virtual content is presented to the user.

Example 114: The display system of Example 113, wherein the manner in which virtual content is presented to the user includes the color of virtual content, the color palette used to provide color to virtual content, the position of virtual content, or movement of virtual content.

Example 115: The display system of any of the Examples above, wherein based on the determinations that the first and second eyes of the user are at least partially closed, the processing electronics are configured to alter a state of the head mounted display system so as to modify a performance feature of the head mounted display system apparent to the user.

Example 116: The display system of Example 115, wherein a performance feature of the head mounted display system apparent to the user includes audio characteristics.

Example 117: The display system of Example 116, wherein said audio characteristics include volume, which speaker a particular sound emanates from, balance between speakers, or any combination thereof.

Example 118: The display system of any of the above Examples, wherein if the first and second eyes of the user are at least partially closed for a duration that exceeds the threshold duration by sufficient amount, the state of the head mounted display system is altered differently.

Example 119: The display system of Example 118, wherein if the the first and second eyes of the user are at least partially closed for a duration that exceeds the threshold duration by sufficient amount, further modification of the virtual content presented to the user, the manner in which virtual content is presented to the user, a performance feature of the head mounted display system apparent to the user, or any combination thereof is added.

Example 120: The display system of Example 118, wherein if the the first and second eyes of the user are at least partially closed for a duration that exceeds the threshold duration by sufficient amount, alternative modification of the virtual content presented to the user, the manner in which virtual content is presented to the user, a performance feature of the head mounted display system apparent to the user, or any combination thereof is provided.

Example 121: The display system of any of the Examples above, said altering of said state of the head mounted display does not reduce power consumption of said head mounted display system.

Example 122: A head mounted display system for displaying image content to a user, the display system comprising:

at least one display configured to be worn by a user to present virtual content to first and second eyes of a user;
at least one inward-facing sensor configured to monitor said first and second eyes of the user; and
processing electronics in communication with the at least one inward-facing sensor and said at least one display, the processing electronics configured to:
present virtual content to the user on said at least one display;
using the at least one inward-facing sensor to detect a gesture, the gesture comprising the first and second eyes of the user transitioning from being in an opened state to being in an at least partially closed state at least a first time and a second time; and
based on detection of said gesture, alter a state of the head mounted display system so as to modify the virtual content presented to the user, the manner in which virtual content is presented to the user, a performance feature of the head mounted display system apparent to the user, or any combination thereof.

Example 123: The display system of Example 122, wherein said first and second times are separated by less than 3 seconds.

Example 124: The display system of Example 122, wherein said first and second times are separated by less than 2 seconds.

Example 125: The display system of Example 122, wherein said first and second times are separated by less than 1.5 seconds.

Example 126: The display system of Example 122, wherein the gesture comprises the first and second eyes of the user transitioning from being in an opened state to being in an at least partially closed state at least three times, a first time, a second time, and a third time.

Example 127: The display system of Example 126, wherein said first and second times as well as said second and third times are separated by less than 3 seconds.

Example 128: The display system of Example 126, wherein said first and second times as well as said second and third times are separated by less than 2 seconds.

Example 129: The display system of Example 126, wherein said first and second times as well as said second and third times are separated by less than 1.5 seconds.

Example 130: The display system of any of the Examples above, wherein said processing electronics are configured to determine a gaze direction of said first and second eyes and use both said gaze direction and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 131: The display system of any of the Examples above, wherein said processing electronics are configured to determine a vergence of said first and second eyes and use both said vergence and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 132: The display system of any of the Examples above, wherein said processing electronics are configured to determine a gaze direction and a vergence of said first and second eyes and use said gaze direction, said vergence, and said determination that the first and second eyes of the user are at least partially closed to determine whether to alter said state of the head mounted display system so as to modify the virtual content presented to the user, the manner in which virtual content is presented to the user, a performance feature of the head mounted display system apparent to the user, or any combination thereof.

Example 133: The display system of any of the Examples above, wherein said processing electronics are configured to display buttons, knobs, windows, menu items, or other regions toward which the user can direct their gaze to make a selection, said processing electronics being configured to identify said gaze direction of said first and second eyes and to use said gaze direction directed at said buttons, knobs, windows, menu items, or other regions and the determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 134: The display system of any of the Examples above, wherein said processing electronics are configured to display buttons, knobs, windows, menu items, or other regions toward which the user can direct their gaze to make a selection, said processing electronics being configured to identify said gaze direction and the vergence of said first and second eyes and to use said gaze direction and vergence directed at said buttons, knobs, windows, menu items, or other regions and the determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 135: The display system of any of the Examples above, wherein said processing electronics are configured to display buttons, knobs, windows, menu items, or other regions toward which the user can direct their gaze to make a selection, said processing electronics being configured to identify said the vergence of said first and second eyes and to use said vergence directed at said buttons, knobs, windows, menu items, or other regions and the determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 136: The display system of any of the Examples above, wherein said processing electronics are configured to use glints on said first and second eyes to determine whether said first and second eyes are at least partially closed.

Example 137: The display system of any of the Examples above, wherein based on detection of said gesture, the processing electronics are configured to alter a state of the head mounted display system so as to modify the virtual content presented to the user.

Example 138: The display system of any of the Examples above, wherein based on detection of said gesture, the processing electronics are configured to alter a state of the head mounted display system so as to modify the manner in which virtual content is presented to the user.

Example 139: The display system of Example 138, wherein the manner in which virtual content is presented to the user includes the color of virtual content, the color palette used to provide color to virtual content, the position of virtual content, or movement of virtual content.

Example 140: The display system of any of the Examples above, wherein based on detection of said gesture, the processing electronics are configured to alter a state of the head mounted display system so as to modify a performance feature of the head mounted display system apparent to the user.

Example 141: The display system of Example 140, wherein a performance feature of the head mounted display system apparent to the user includes audio characteristics.

Example 142: The display system of Example 141, wherein said audio characteristics include volume, which speaker a particular sound emanates from, balance between speakers, or any combination thereof.

Example 143: The display system of any of the Examples above, wherein said gesture comprises said first and second eyes being partially closed.

Example 144: The display system of any of the Examples above, wherein said gesture comprises said first and second eyes squinting.

Example 145: The display system of any of the Examples above, wherein said gesture comprises said first and second eyes being fully closed.

Example 146: The display system of any of the Examples above, wherein said gesture comprises said first and second eyes blinking.

Example 147: The display system of any of the Examples above, wherein said at least one inward facing sensor comprises at least one optical detector.

Example 148: The display system of any of the Examples above, wherein said at least one inward facing sensor comprises at least one inward facing camera.

Example 149: The display system of any of the Examples above, wherein said at least one inward facing sensor comprises a first inward facing sensor configured to monitor the first eye and a second inward facing sensor configured to monitor the second eye.

Example 150: The display system of Example 149, wherein first and second inward facing sensors comprise first and second inward facing cameras.

Example 151: The display system of any of the Examples above, said altering of said state of the head mounted display does not reduce power consumption of said head mounted display system.

Example 152: A head mounted display system for displaying image content to a user, the display system comprising:
　　at least one display configured to be worn by a user to present virtual content to first and second eyes of a user;
　　a first inward facing camera configured to image the first eye of the user; and
　　processing electronics in communication with the first inward-facing camera and said at least one display, the processing electronics configured to:
　　　　present virtual content to the user on said at least one display;
　　　　using the first inward-facing camera detect a gesture comprising movement in gaze of said first eye; and based on the detection of said gesture, alter a state of the head mounted display system so as to modify the virtual content presented to the user, the manner in which virtual content is presented to the user, a performance feature of the head mounted display system apparent to the user, or any combination thereof.

Example 153: The display system of Example 152, wherein gesture comprises movement of said gaze from left to right or from right to left back.

Example 154: The display system of Example 152, wherein gesture comprises movement of said gaze from left to right back to left or from right to left back to right.

Example 155: The display system of any of the above Examples, wherein gesture comprises movement of said gaze up, then down, or down, then up.

Example 156: The display system of Example 155, wherein said processor further detects gaze moving from left to right at least 4 times just prior to said gesture.

Example 157: The display system of Example 155, wherein said processor further detects gaze moving from left to right at least 8 times just prior to said gesture.

Example 158: The display system of any of the above Examples, wherein gesture comprises movement of said gaze up, then down, and back up or movement of said gaze down, then up, and back down.

Example 159: The display system of any of the above Examples, wherein gesture comprises movement of said gaze from in horizontal direction followed by movement of said gaze in the vertical direction or movement of said gaze from in vertical direction followed by movement of said gaze in the horizontal direction.

Example 160: The display system of any of the above Examples, wherein gesture occurs in a threshold amount of time or less.

Example 161: The display system of Example 160, wherein said threshold amount of time is between 100 ms and 250 ms.

Example 162: The display system of Example 160, wherein said threshold amount of time is between 250 ms and 500 ms.

Example 163: The display system of Example 160, wherein said threshold amount of time is between 500 ms and 750 ms.

Example 164: The display system of Example 160, wherein said threshold amount of time is between 750 ms and 1 second.

Example 165: The display system of any of the above, wherein said processing electronics are configured to display on said display a prompt to prompt the user to move said gaze in a particular manner to indicate a selection or command.

Example 166: The display system of any of the Examples above, wherein based on detection of the gesture, the processing electronics are configured to alter a state of the head mounted display system so as to modify the virtual content presented to the user.

Example 167: The display system of any of the Examples above, wherein based on detection of the gesture, the processing electronics are configured to alter a state of the head mounted display system so as to modify the manner in which virtual content is presented to the user.

Example 168: The display system of Example 167, wherein the manner in which virtual content is presented to the user includes the color of virtual content, the color palette used to provide color to virtual content, the position of virtual content, or movement of virtual content.

Example 169: The display system of any of the Examples above, wherein based on detection of the gesture, the processing electronics are configured to alter a state of the head mounted display system so as to modify a performance feature of the head mounted display system apparent to the user.

Example 170: The display system of Example 169, wherein a performance feature of the head mounted display system apparent to the user includes audio characteristics.

Example 171: The display system of Example 170, wherein said audio characteristics include volume, which speaker a particular sound emanates from, balance between speakers, or any combination thereof.

Example 172: The display system of any of the Examples above, said altering of said state of the head mounted display does not reduce power consumption of said head mounted display system.

Example 173: A head mounted display system for displaying image content to a user, the display system comprising:
at least one display configured to be worn by a user to present virtual content to first and second eyes of a user;
at least one inward facing sensor configured to monitor the first eye or second eye of the user or both the first and second eye of the user; and
processing electronics in communication with at least one inward-facing camera and said at least one display, the processing electronics configured to:
present virtual content to the user on said at least one display;
using the at least one inward-facing camera detect a gesture comprising a combination of at least two of the partially or fully closing of one of said eyes, movement in gaze of one of said eyes, or change in vergence; and
based on the detection of said gesture, alter a state of the head mounted display system so as to modify the virtual content presented to the user, the manner in which virtual content is presented to the user, a performance feature of the head mounted display system apparent to the user, or any combination thereof.

Example 174: The display system of Example 173, wherein said gesture comprises a combination of at least partially or fully closing one of said eyes and movement in gaze of one of said eyes.

Example 175: The display system of Example 173, wherein said gesture comprises a combination of at least partially or fully closing one of said eyes and change in vergence.

Example 176: The display system of Example 173, wherein said gesture comprises a combination of at least movement in gaze of one of said eyes and change in vergence.

Example 177: The display system of Example 173, wherein said gesture comprises a combination of at least partially or fully closing one of said eyes, movement in gaze of one of said eyes and change in vergence.

Example 178: The display system of any of the Examples above, wherein said at least one inward facing sensor comprises at least one inward facing optical detector.

Example 179: The display system of any of the Examples above, wherein said at least one inward facing sensor comprises at least one inward facing camera.

Example 180: The display system of any of the Examples above, wherein said at least one inward facing sensor comprises a first inward facing sensor configured to monitor the first eye and a second inward facing sensor configured to monitor the second eye.

Example 181: The display system of Example 180, wherein first and second inward facing sensors comprise first and second inward facing cameras.

Example 182: The display system of any of the Examples above, wherein said processing electronics are configured to display buttons, knobs, windows, menu items, or other regions toward which the user can direct their gaze to make a selection, said processing electronics being configured to identify said gaze direction of said first and second eyes and to use said gaze direction directed at said buttons, knobs, windows, menu items, or other regions and the determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 183: The display system of any of the Examples above, wherein said processing electronics are configured to display buttons, knobs, windows, menu items, or other regions toward which the user can direct their gaze to make a selection, said processing electronics being configured to identify said gaze direction and the vergence of said first and second eyes and to use said gaze direction and vergence directed at said buttons, knobs, windows, menu items, or other regions and the determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 184: The display system of any of the Examples above, wherein said processing electronics are configured to display buttons, knobs, windows, menu items, or other regions toward which the user can direct their gaze to make a selection, said processing electronics being configured to identify said the vergence of said first and second eyes and to use said vergence directed at said buttons, knobs, windows, menu items, or other regions and the determination that the first and second eyes of the user are at least partially closed in identifying a command or selection to alter said state of the head mounted display system so as to modify the virtual content presented to the user, the manner in which virtual content is presented to the user, a performance feature of the head mounted display system apparent to the user, or any combination thereof.

Example 185: The display system of any of the Examples above, wherein based on detection of said gesture, the processing electronics are configured to alter a state of the head mounted display system so as to modify the virtual content presented to the user.

Example 186: The display system of any of the Examples above, wherein based on detection of said gesture, the processing electronics are configured to alter a state of the head mounted display system so as to modify the manner in which virtual content is presented to the user.

Example 187: The display system of Example 186, wherein the manner in which virtual content is presented to the user includes the color of virtual content, the color palette used to provide color to virtual content, the position of virtual content, or movement of virtual content.

Example 188: The display system of any of the Examples above, wherein based on detection of said gesture, the processing electronics are configured to alter a state of the head mounted display system so as to modify a performance feature of the head mounted display system apparent to the user.

Example 189: The display system of Example 188, wherein a performance feature of the head mounted display system apparent to the user includes audio characteristics.

Example 190: The display system of Example 189, wherein said audio characteristics include volume, which speaker a particular sound emanates from, balance between speakers, or any combination thereof.

Example 191: The display system of any of the Examples above, wherein said gesture comprises said first and second eyes being partially closed.

Example 192: The display system of any of the Examples above, wherein said gesture comprises said first and second eyes squinting.

Example 193: The display system of any of the Examples above, wherein said gesture comprises said first and second eyes being fully closed.

Example 194: The display system of any of the Examples above, wherein said gesture comprises said first and second eyes blinking.

Example 195: The display system of any of the Examples above, said altering of said state of the head mounted display does not reduce power consumption of said head mounted display system.

Example 196: A head mounted display system for displaying image content to a user, the display system comprising:
  at least one display configured to be worn by a user to present virtual content to first and second eyes of a user;
  at least one inward facing sensor configured to monitor the first eye and the second eye of the user; and
  processing electronics in communication with at least one inward-facing camera and said at least one display, the processing electronics configured to:
    present virtual content to the user on said at least one display;
    using the at least one inward-facing camera to detect a gesture comprising winking in said first eye and subsequently winking in said second eye; and
    based on the detection of said gesture, alter a state of the head mounted display system so as to modify the virtual content presented to the user, the manner in which virtual content is presented to the user, a performance feature of the head mounted display system apparent to the user, or any combination thereof.

Example 197: The display system of Example 196, wherein based on detection of the gesture, the processing electronics are configured to alter a state of the head mounted display system so as to modify the virtual content presented to the user.

Example 198: The display system of any of the Examples above, wherein based on detection of the gesture, the processing electronics are configured to alter a state of the head mounted display system so as to modify the manner in which virtual content is presented to the user.

Example 199: The display system of Example 198, wherein the manner in which virtual content is presented to the user includes the color of virtual content, the color palette used to provide color to virtual content, the position of virtual content, or movement of virtual content.

Example 200: The display system of any of the Examples above, wherein based on detection of the gesture, the processing electronics are configured to alter a state of the head mounted display system so as to modify a performance feature of the head mounted display system apparent to the user.

Example 201: The display system of Example 200, wherein a performance feature of the head mounted display system apparent to the user includes audio characteristics.

Example 202: The display system of Example 201, wherein said audio characteristics include volume, which speaker a particular sound emanates from, balance between speakers, or any combination thereof.

Example 203: The display system of any of the Examples above, wherein said at least one inward facing sensor comprises at least one optical detector.

Example 204: The display system of any of the Examples above, wherein said at least one inward facing sensor comprises at least one inward facing camera.

Example 205: The display system of any of the Examples above, wherein said at least one inward facing sensor comprises a first inward facing sensor configured to monitor the first eye and a second inward facing sensor configured to monitor the second eye.

Example 206: The display system of Example 205, wherein first and second inward facing sensors comprise first and second inward facing cameras.

Example 207: The display system of any of the Examples above, said altering of said state of the head mounted display does not reduce power consumption of said head mounted display system.

Example 208: A head mounted display system for displaying image content to a user, the display system comprising:
- at least one display configured to be worn by a user to present virtual content to first and second eyes of a user;
- at least one inward-facing sensor configured to monitor said first or second eye of the user or both; and
- processing electronics in communication with the at least one inward-facing sensor and said at least one display, the processing electronics configured to:
  - present virtual content to the user on said at least one display;
  - using the at least one inward-facing sensor, determine that the first eye or second eye or both are in a first eye status; and
  - based on the determinations that the first eye or second eye or both are in a first eye status for a threshold duration, alter a state of the head mounted display system so as to modify the virtual content presented to the user, the manner in which virtual content is presented to the user, a performance feature of the head mounted display system apparent to the user, or any combination thereof.

Example 209: The display system of Example 208, wherein said threshold duration is in a range from 500 milliseconds to 1 second.

Example 210: The display system of Example 208, wherein said threshold duration is in a range from 750 milliseconds and 1.5 seconds.

Example 211: The display system of Example 208, wherein said threshold duration is in a range from 1 second and 3 seconds.

Example 212: The display system of Example 208, wherein said threshold duration is in a range from 3 seconds and 5 seconds.

Example 213: The display system of any of the Examples above, wherein said first status is that said first eye is partially closed for at least said threshold duration.

Example 214: The display system of any of the Examples above, wherein said first status is that said first eye is squinting for at least said threshold duration.

Example 215: The display system of any of the Examples above, wherein said first status is that said first and second eyes are squinting for at least said threshold duration.

Example 216: The display system of any of the Examples above, wherein said said first status is that said first eye is fully closed for at least said threshold duration.

Example 217: The display system of any of the Examples above, wherein said said first status is that said first and second eyes are fully closed for at least said threshold duration.

Example 218: The display system of any of the Examples above, wherein said first status is that said first and second eyes are blinking for at least said threshold duration.

Example 219: The display system of any of the Examples above, wherein said at least one inward facing sensor comprises at least one optical detector.

Example 220: The display system of any of the Examples above, wherein said at least one inward facing sensor comprises at least one camera.

Example 221: The display system of any of the Examples above, wherein said at least one inward facing sensor comprises a first inward facing sensor configured to monitor the first eye and a second inward facing sensor configured to monitor the second eye, respectively.

Example 222: The display system of Example 221, wherein first and second inward facing sensors comprise first and second inward facing cameras.

Example 223: The display system of any of the Examples above, wherein based on detection of said first eye status, the processing electronics are configured to alter a state of the head mounted display system so as to modify the virtual content presented to the user.

Example 224: The display system of any of the Examples above, wherein based on detection of said first eye status, the processing electronics are configured to alter a state of the head mounted display system so as to modify the manner in which virtual content is presented to the user.

Example 225: The display system of Example 224, wherein the manner in which virtual content is presented to the user includes the color of virtual content, the color palette used to provide color to virtual content, the position of virtual content, or movement of virtual content.

Example 226: The display system of any of the Examples above, wherein based on direction of said first eye status, the processing electronics are configured to alter a state of the head mounted display system so as to modify a performance feature of the head mounted display system apparent to the user.

Example 227: The display system of Example 226, wherein a performance feature of the head mounted display system apparent to the user includes audio characteristics.

Example 228: The display system of Example 227, wherein said audio characteristics include volume, which speaker a particular sound emanates from, balance between speakers, or any combination thereof.

Example 229: The display system of any of the Examples above, said altering of said state of the head mounted display does not reduce power consumption of said head mounted display system.

Example 230: A display system for controlling display of image content, the display system comprising:

an inward-facing sensor;
a display configured to be worn by a user; and
processing electronics in communication with the inward-facing sensor and the display, the processing electronics configured to:
  using the inward-facing sensor, detect a first focal point of the user's eyes;
  based on the detected first focal point of the eyes, present first virtual content on the display;
  using the inward-facing sensor, detect a second focal point of the user's eyes; and
  based on the detected second focal point of the eyes, modify presentation of the virtual content to display second virtual content.

Example 231: The display system of Example 230, wherein first virtual content comprises a static image and wherein the second virtual content comprises animated content.

Example 232: The display system of any of Examples 230-231, wherein the second focal point is disposed at a surface of the display.

Example 233: The display system of Example 232, wherein the surface of the display comprises an inner surface nearer the user's eyes than an outer surface.

Example 234: The display system of any of Examples 230-233, wherein the processing electronics are configured to modify presentation of the virtual content to display the second virtual content based on a minimum focus time during which the user's eyes are focused on the second focus point.

Example 235: The display system of Example 234, wherein the minimum focus time is greater than 0.5 s.

Example 236: The display system of any of Examples 230-235, wherein the inward-facing sensor comprises a plurality of cameras.

Example 237: The display system of any of Examples 230-236, wherein a first camera is configured to track an orientation of a first eye of the user and wherein a second camera is configured to track an orientation of a second eye of the user.

Example 238 The display system of any of Examples 230-237, wherein the display comprises a liquid crystal display (LCD).

Example 239: The display system of any of Examples 230-238, wherein the processing electronics are configured to display the second content so long as the inward-facing sensor detects the second focal point of the eys.

Example 240: A display system for modifying a display mode, the display system comprising:
  a display configured to be worn by a user;
  a first inward facing sensor configured to image a first eye of the user;
  a second inward facing sensor configured to image a second eye of the user; and
  processing electronics in communication with the inward-facing sensors and the display, the processing electronics configured to:
    present virtual content to the user in a first display mode;
    using the first inward-facing sensor, determine that the first eye is closed for longer than a threshold time;
    using the second inward-facing sensor, determine that the second eye is closed for longer than the threshold time;
    based on the determinations that the first and second eyes of the user are closed for longer than the threshold time, present the virtual content to the user in a second mode.

Example 241: The display system of Example 240, wherein the first mode comprises a display of virtual content using a first pallet of color and wherein the second mode comprises a display of the virtual content using a second pallet color.

Example 242: The display system of any of Examples 240-241, wherein the display of the virtual content using the first pallet of color comprises displaying a first color for a virtual object and wherein the display of the virtual content using the second pallet of color comprises displaying a second color for the virtual object.

Example 243: The display system of any of Examples 240-242, wherein the threshold time is at least 0.5 s.

Example 244: The display system of any of Examples 240-243, wherein the first mode comprises a display of virtual content at a first location on the display and wherein the second mode comprises a display of the virtual content at a second location on the display.

Example 245: The display system of any of Examples 240-244, wherein the processing electronics are configured, in the second mode, to display a movement of the virtual content along a predictable path.

Example 246: The display system of any of Examples 240-245, wherein the processing electronics are further configured to:
  using the first and second inward-facing sensors, determine that the first and second eyes are closed for longer than a second threshold time;
  based on the determinations that the first and second eyes are closed for longer than the second threshold time, update the display to present an object of the virtual content in a different color.

Example 247: The display system of any of Examples 240-246, wherein the second threshold time is about 1 s.

Example 248: The display system of any of Examples 240-247, wherein the predictable path comprises a path that appears to move toward a target destination.

Example 249: The display system of any of Examples 240-248, wherein the target destination comprises the user.

Example 250: The display system of any of Examples 240-245, wherein the processing electronics are further configured to:
  using the first and second inward-facing sensors, determine that the first and second eyes are closed for longer than a second threshold time;
  based on the determinations that the first and second eyes are closed for longer than the second threshold time, update the display to present an object of the virtual content in a different mode.

Additional Considerations

Various example implementations of the invention are described herein. Reference is made to these examples in a non-limiting sense. They are provided to illustrate more broadly applicable aspects of the invention. Various changes may be made to the invention described and equivalents may be substituted without departing from the spirit and scope of the invention. For example, while advantageously utilized with AR displays that provide images across multiple depth planes, the augmented reality content disclosed herein may also be displayed by systems that provide images on a single depth plane.

Many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several implementations without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

Example aspects of the invention, together with details regarding material selection and manufacture have been set forth above. As for other details of the present invention, these may be appreciated in connection with patents and publications generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A head mounted display system for displaying image content to a user, the display system comprising:
   a frame;
   a wearable display coupled to the frame and configured to present virtual content to first and second eyes of a user;
   a speaker coupled to the frame and positioned in proximity to a first or second ear of the user;
   a first inward facing camera configured to image the first eye of the user;
   a second inward facing camera configured to image the second eye of the user; and
   a processing module coupled to the frame and in electronic communication with the first and second inward facing cameras and the wearable display, the processing module comprising one or more processing electronics configured to:
      present virtual content to the user on the wearable display in a first configuration;
      using the first inward facing camera or the second inward facing camera, determine that the user has performed a gesture; and
      based on determining that the user has performed the gesture, present virtual content to the user on the wearable display in a second configuration,
      wherein presenting virtual content to the user on the wearable display in a second configuration comprises altering a state of the head mounted display system to modify a manner in which virtual content is presented to the user, and
      wherein the manner in which virtual content is presented to the user includes a color palette used to provide color to the virtual content.

2. The display system of claim 1, wherein determining that the user has performed a gesture comprises:
   determining that at least one of the first eye or the second eye of the user is at least partially closed for longer than a threshold time.

3. The display system of claim 2, wherein the processing module is configured to use glints on the first and second eyes to determine whether the first and second eyes are at least partially closed.

4. The display system of claim 2, wherein based on the determination that the first and second eyes of the user are at least partially closed, the processing module is configured to alter a state of the head mounted display system so as to modify a performance feature of the head mounted display system apparent to the user.

5. The display system of claim 4, wherein a performance feature of the head mounted display system apparent to the user includes audio characteristics.

6. The display system of claim 5, wherein the audio characteristics include volume, which speaker a particular sound emanates from, balance between speakers, or any combination thereof.

7. The display system of claim 1, wherein determining that the user has performed a gesture comprises:
   determining a gaze direction of at least one of the first eye or the second eye; and determining a vergence of the first eye and of the second eye.

8. The display system of claim 1, wherein determining that the user has performed a gesture comprises:
   determining that at least one of the first eye or the second eye are fully closed for longer than a threshold time.

9. The display system of claim 8, wherein the threshold time is in a range from 500 milliseconds to 1.5 seconds.

10. The display system of claim 8, wherein the threshold time is in a range from 750 milliseconds to 2 seconds.

11. The display system of claim 8, wherein the threshold time is in a range from 1 second to 3 seconds.

12. The display system of claim 8, wherein the threshold time is in a range from 3 seconds to 10 seconds.

13. The display system of claim 1, wherein determining that the user has performed a gesture comprises:
   determining that at least one of the first eye or the second eye blinked.

14. The display system of claim 1, wherein determining that the user has performed a gesture comprises:
   determining that at least one of the first eye or the second eye squinted.

15. The display system of claim 1, wherein determining that the user has performed a gesture comprises determining, by the first inward facing camera or the second inward facing camera, whether a pupil or iris of the user is partially or fully blocked.

16. The display system of claim 1, wherein presenting virtual content to the user on the wearable display in a second configuration comprises altering a state of the head mounted display system to modify the virtual content presented to the user.

17. The display system of claim 1, wherein the processing module is configured to display buttons, knobs, windows, menu items, or other regions toward which the user can direct a gaze to make a selection.

* * * * *